United States Patent
Clark et al.

(10) Patent No.: US 8,463,589 B2
(45) Date of Patent: Jun. 11, 2013

(54) MODIFYING A VIRTUAL PROCESSOR MODEL FOR HARDWARE/SOFTWARE SIMULATION

(75) Inventors: Neville A. Clark, Quorrobolong (AU); James R. Torossian, Whale Beach (AU)

(73) Assignee: Synopsys, Inc., Mountain View, CA (US)

(*) Notice: Subject to any disclaimer, the term of this patent is extended or adjusted under 35 U.S.C. 154(b) by 954 days.

(21) Appl. No.: 12/159,831

(22) PCT Filed: Jul. 30, 2007

(86) PCT No.: PCT/US2007/016961
§ 371 (c)(1),
(2), (4) Date: Jul. 1, 2008

(87) PCT Pub. No.: WO2008/013968
PCT Pub. Date: Jan. 31, 2008

(65) Prior Publication Data
US 2008/0319730 A1 Dec. 25, 2008

Related U.S. Application Data

(60) Provisional application No. 60/820,768, filed on Jul. 28, 2006.

(51) Int. Cl.
*G06F 9/45* (2006.01)
*G06F 9/455* (2006.01)

(52) U.S. Cl.
USPC .................................... 703/22; 716/106

(58) Field of Classification Search
USPC ................... 703/22; 716/100–106
See application file for complete search history.

(56) References Cited

U.S. PATENT DOCUMENTS

| | | | |
|---|---|---|---|
| 5,918,035 A | 6/1999 | Van Praet et al. | |
| 6,026,461 A | 2/2000 | Baxter et al. | |
| 6,044,211 A | 3/2000 | Jain | |
| 6,138,229 A * | 10/2000 | Kucukcakar et al. | 712/37 |
| 6,152,612 A | 11/2000 | Liao et al. | |
| 6,230,114 B1 | 5/2001 | Hellestrand et al. | |
| 6,263,302 B1 | 7/2001 | Hellestrand et al. | |
| 6,324,495 B1 | 11/2001 | Steinman | |
| 6,477,683 B1 * | 11/2002 | Killian et al. | 716/106 |
| 6,584,436 B2 | 6/2003 | Hellestrand et al. | |

(Continued)

OTHER PUBLICATIONS

Scott, K. et al., "Strata: A Software Dynamic Translation Infrastructure," 2001, citeseer.ist.psu.edu, pp. 1-10.

(Continued)

*Primary Examiner* — Dwin M Craig
(74) *Attorney, Agent, or Firm* — Blakely, Sokoloff, Taylor & Zafman LLP; Judith A. Szepesi

(57) ABSTRACT

A method of transforming a provided virtual processor model to a user virtual processor model. Also a tool, e.g., provided as instructions for operating in a host computer system for converting a provided virtual processor model to a user virtual processor model. Also a method of specifying one or more characteristics of a target processor to transform a provided virtual processor model to a user virtual processor model that when operating in a c-simulation system, simulates the operation of the target processor. For example, a method of specifying one or more characteristics of instructions to transform a provided virtual processor model to a user virtual processor model.

33 Claims, 36 Drawing Sheets

U.S. PATENT DOCUMENTS

| | | | |
|---|---|---|---|
| 6,678,645 B1 | 1/2004 | Rajsuman et al. | |
| 6,680,915 B1 | 1/2004 | Park et al. | |
| 6,751,583 B1 | 6/2004 | Clarke et al. | |
| 6,973,630 B1* | 12/2005 | Dao et al. | 716/104 |
| 7,313,773 B1 | 12/2007 | Braun et al. | |
| 7,401,015 B1 | 7/2008 | Bailey et al. | |
| 2001/0010072 A1* | 7/2001 | Yoshida | 712/209 |
| 2002/0032559 A1* | 3/2002 | Hellestrand et al. | 703/22 |
| 2002/0083420 A1 | 6/2002 | Zammit et al. | |
| 2003/0115564 A1 | 6/2003 | Chang et al. | |
| 2003/0229741 A1 | 12/2003 | Stuber et al. | |
| 2004/0088150 A1 | 5/2004 | Gay | |
| 2004/0111247 A1 | 6/2004 | Berevoescu et al. | |
| 2004/0117167 A1 | 6/2004 | Neifert et al. | |
| 2004/0117168 A1 | 6/2004 | Neifert et al. | |
| 2004/0122644 A1 | 6/2004 | Neifert et al. | |
| 2004/0250231 A1 | 12/2004 | Killian et al. | |
| 2005/0055675 A1 | 3/2005 | Neifert et al. | |
| 2005/0111490 A1 | 5/2005 | Gillet et al. | |
| 2005/0165597 A1 | 7/2005 | Nightingale | |
| 2005/0228627 A1 | 10/2005 | Bellantoni | |
| 2005/0228628 A1 | 10/2005 | Bellantoni | |
| 2006/0031615 A1 | 2/2006 | Bruce et al. | |
| 2006/0149526 A1 | 7/2006 | Torossian et al. | |
| 2006/0179182 A1 | 8/2006 | Chadha et al. | |
| 2006/0229858 A1 | 10/2006 | Devins et al. | |
| 2006/0282233 A1 | 12/2006 | Pasricha et al. | |
| 2006/0282586 A1 | 12/2006 | Shibuya | |
| 2007/0067528 A1 | 3/2007 | Schaffer et al. | |
| 2008/0215304 A1 | 9/2008 | Bailey et al. | |

OTHER PUBLICATIONS

Fauth, A. et al., "Describing Instruction Set Processors Using nMl," Mar. 1995, European Design and Test Conference, pp. 503-507.

D'Errico et al., "Constructing Portable Compiled Instruction-set Simulators—An ADL-driven Approach," Mar. 2006, Proceedings of Design, Automation and Test in Europe, six unnumbered pages.

Reshadi, M. et al., "ReXSim: A Retargetable Framework for Instruction-set Architecture Simulation," Feb. 2003, Center for Embedded Computer Systems Technical Report #03-05, University of California, Irvine, sixteen unnumbered pages.

Schnarr, E.C., "Facile: A Language and Compiler for High-performance Processor Simulators," 2001, Proceedings of the ACM SIGPLAN 2001 Conference on Programming Language Design and Implementation, pp. 321-331.

Halambi, A. et al., "Expression: A Language for Architecture Exploration Through Compiler/Simulator Retargetability," 1999, Proceedings of Design, Automation and Test in Europe, pp. 1-6.

Moona, R., "Processor Models for Retargetable Tools," 2000, Proceedings of the 11$^{th}$ International Workshop on Rapid System Prototyping, pp. 1-6.

Chandra, S. et al., "Retargetable Functional Simulator Using High Level Processor Models," 2000, International Conference on VLSI Design, six unnumbered pages.

Leupers, R. et al., "Generation of Interpretive and Compiled Instruction Set Simulators," Jan. 1999, Proceedings of the Design Automation Conferences, pp. 339-342.

Braun, G. et al., "Using Static Scheduling Techniques for the Retargeting of High Speed, Compiled Simulators for Embedded Processors from an Abstract Machine Description," 2001, Proceedings of the 14$^{th}$ International Symposium on System Synthesis, pp. 57-62.

Search Report, dated May 21, 2008, for PCT Patent Application No. PCT/US07/16961, 4 pages.

Clark, et al., U.S. Appl. No. 11/830,435, filed Jul. 30, 2007, entitled "Method and Apparatus for Modifying a Virtual Processor Model for Hardware/Software Simulation".

PCT Notification Concerning Transmittal of Int'l. Preliminary Report on Patentability and Written Opinion, for PCT/US2007/016961, Mailed Feb. 3, 2009, 10 pages.

"AMBA AXA Protocol, v1.0, Specification," ARM Limited, 2004, 108 pages.

BENINI, et al., "SystemC Cosimulation and Emulation of Multiprocessor SoC Designs," Computer, vol. 36, No. 4, Apr. 2003, pp. 53-59.

IEEE Standard Hardware Description Language Based on Verilog® Hardware Description Language, IEEE Std 1354-1995, approved Aug. 1996 American National Standards Institute, one page (abstract only).

IEEE Standard VHDL Language Reference Manual, IEEE Std 1076-1993 (revision of IEEE Std 1076-1987), approved Sep. 1993 IEEE Standards Board, one page (abstract only).

Khouri, Kamal S, et al, "Clock Selection for Performance Optimization of Control-Flow Intensive Behaviors," IEEE Transactions on Computer-Aided Design of Integrated Circuits and Systems, vol. 20, No. 1, Jan. 2001, 7 pages.

Posner, M, et al, "Designing Using the AMBA™ 3 AXI Protocol—Easing the Design Challenges and Putting the Verification Task on a Fast Track to Success," Synopsys, Inc, Apr. 2005, 10 pages.

* cited by examiner

ADD

| 31 | 28 | 27 | 26 | 25 | 24 | 23 | 22 | 21 | 20 | 19     16 | 15     12 | 11                    0 |
|----|----|----|----|----|----|----|----|----|----|-----------|-----------|-------------------------|
| Cond | | 0 | 0 | 1 | 0 | 1 | 0 | 0 | S | Rn | Rd | Shifter Operand |

Where
Cond = Condition Field
S = CPSR Update
Rn = Register of First Operand
Rd = Destination Register
Shifter Operand = Specifies second operand for the addition

FIG. 21A

ADD #immd, Dn

ADD #u5, Dn    1 1 1    | 15                8 | 7                0 |
                        | 0 * 1 1 1 0 F F      | F 1 0 i i i i i   | where * = 1 when instructtion is last in a serially grouped VLES, or is in a prefix grouped VLES. Otherwise * = 0

FIG. 21B

Table 1

| Field Name | Add Element | Description |
|---|---|---|
| VpmUserIsa: | InstructionDefinition | Fixed template field which reflects the project name. |
| Instruction Sets: | InstructionSet | Fixed template header field for the element that follows |
| VaSTSeed | InstructionSet | Name of the seed that the ISA is based on |
| UserInstructionBlock | Block | Conceptual grouping of instructions, allowing design partitioning and grouping of like instructions such as 'arithmetic' 'logical' etc. |
| Instructions | Instructions | Fixed header field instruction element the follows |
| MyMov | Instruction | User input of name of the instruction that is being added |
| Identifiers | Identifiers | Fixed header field for the identifier element that follows |
| Behavior | Identifier | Name of the "behavior" function of type behavior that will be generated into the namespace definition |
| Mnemonic | Identifier | Name of the "mnemonic" function of type mnemonic that will be generated into the namespace definition |
| Timing | Identifier | Name of the "timing" function of type timing that will be generated into the namespace definition |
| extract | Identifier | Name of the "extract" function of type extract that will be generated into the namespace definition |
| Fields | Identifier | Name of the "fields" structure of type sFields that will be generated into the namespace |
| Patterns | Pattern | Header field for the pattern element that follows. |
| Pattern Definition | Pattern | User input of the opcode pattern |

FIG. 23

```
Namespace InstSet_MyInst_v1
{
        struct sFields
        {
                enum eVpmReg Rn;
                enum eVpmReg Rd;
                tBoolean Cpsr;
                tWord16 So;
                tWord16 Cond;
        };

void tInt32 extract(const void * const pImage, sFields * const
        pField)
        {
                const tWord 32 * const pImage32 = (tWord32*)pImage;
                pField->So = pImage32[0] & 0xFFF;
                pField->Rd = eVpmReg((pImage32[0] >> 4) & 0xF);
                pField->Rn = eVpmReg((pImage32[0] >> 8) & 0xF);
                pField->Cpsr = pImage32[0] & 0x00100000;
                pField->Cond = (pImage32[0] >> 28) & 0xF;
                return sizeof(sFields);
        }

// define the rest of the instruction function definitions.
}
```

FIG. 24

```
namespace InstSet_MyMov_v1
{
        struct sFields
        {
                enum eVpmReg Rn;
                enum eVpmReg Rm;
        };

// extract Function definition

// behavior Function definition

// timing Function definition tInt32 Mnemonic(const tVpmMnem * const pVpmMnem, const sFields *
        const pFields, char * const pMnemonic)
        {
                return sprintf(pMnemonic, "Mov %s, %s",
                pVpmMnem->GetRegName(pFields->Rn),
                pVpmMnem->GetRegName(pFields->Rm));
        }
}
```

FIG. 27

```
namespace InstSet_MyMov_v1
{
    struct sFields
    {
        enum eVpmReg Rm;
        enum eVpmReg Rn;
    };

// Extract Function definition void Behaviour(const tVpmGen * const pVpmGen, const sFields *
const    pFields)
    {
        pVpmGen->GetReg(rEBX, pFields->Rm);
        pVpmGen->PutReg(rEBX, pFields->Rn);
    }

// define the rest of the instruction function definitions

```
namespace InstSet_MyJump_v1
{
        struct sFields
        {
                enum eVpmReg Rn;
                tInt32 PcOffset;
        };

//Extract Function definition void Behaviour(const tVpmGen * const pVpmGen, const sFields * const
pFields)
{
        pVpmGen->GetReg(rEAX, pFields->Rn); //Store Register xCmp rEAX << 0;    //compare if value is '0' in EAX xIF(ccEQ);         //Branch if this is the case pVpmGen->JumpFixedOffset(pFields->PcOffset);
        xENDIF;
}
```

FIG. 30

| Table 2 | | |
|---|---|---|
| Instruction | Translate Time | Runtime |
| MOV Rn, Rm : | Register Number | Contents of Registers |
| MOV Rn, imm8 | Register Number and Immediate Value | Contents of Registers |
| LW Rn,disp16(Rm) | Register Number and Displacement | Contents of Register Rm hence the Address |
| BEQ Rn, Rm,disp17.align2 | Register Number and Address to Branch to | Contents of Registers |

FIG. 32

```
#undef XXX
#define XXX -1
static tInt32 const PipelineDelays[] =
{
    //          Stage in which register is written (write occurs at end of stage)
    //   0,     1,    2,   1,    0,    2,     1,
    //   Exec   Mem   WB   Mult  Sat   RdSht  Link
    /*Exec*/  { 0x1,  0x3,  XXX,  0x3,  0x1,  0x7,  0x3,    //0 Stage in which
    /*Mem*/     0x0,  0x1,  XXX,  0x1,  0x0,  0x3,  0x1,    //1 register
    /*WB*/      0x0,  0x0,  XXX,  0x0,  0x0,  0x1,  0x0,    //2 is
    /*Mult*/    0x0,  0x1,  XXX,  0x1,  0x1,  0x3,  0x1,    //1 read
    /*Sat*/     0x1,  0x3,  XXX,  0x3,  0x1,  0x7,  0x3,    //0 read occurs
    /*RdSht*/   0x0,  0x1,  XXX,  0x1,  0x0,  0x3,  0x1,    //2 at beginning
    /*Link*/    0x0,  0x1,  XXX,  0x1,  0x0,  0x3,  0x1,    //1 of stage.
};
#undef XXX
```

FIG. 37

```
cKeyValuePair PipelineDef n() =
(
    cKeyValuePair ("Version", 0x100),                                           // Version for this structure
    cKeyValuePair ("NunberOfExecPipelines", 1),                                 // Version for this structure
    cKeyValuePair ("NunberOfFetchStages", 2),                                   // Number of Pipelines
    cKeyValuePair ("NunberOfExecStagesff, 3),                                   // Fetch/Decode stages
    cKeyValuePair ("MaxDelay", 3,),                                             // Exec stages
    //cKeyValuePair ("MinInstLatency", 1),                                      // Max 'stall' Delay
    cKeyValuePair ("NumberOfExecNames", eMaxExecStage),                         // Min Inst Latency (reduces MaxDelay)
    cKeyValuePair ("ExecNmes", ( tHadr)&ExecStageNme[0]),                       // Total Number of Names
    cKeyValuePair ("ExecIndex", (tHadr) &ExecStageIndex[0]),                    // Ptr to array of Index
    cKeyValuePair ( "ExecByPass", (tHadr) &PipelineDelays[0]),                  // Ptr to Matrix of required delays cKeyValuePair ("SkippedInstMaxLatency", 1),                                 // 'Skipped' instruction never exceed
    cKeyValuePair ("SkippedInstHaveResultLatency", false),                      // 'Skipped' instruction Dont Have Result latency
    cKeyValuePair ("SkippedInstStallRegUsage", true),                           // 'Skipped' instruction Still stall on input registers cKeyValuePair(0, 0)
);
```

FIG. 38

MODIFYING A VIRTUAL PROCESSOR MODEL FOR HARDWARE/SOFTWARE SIMULATION

CROSS-REFERENCE TO RELATED APPLICATIONS

The present application claims the benefit of U.S. Provisional Appl. No. 60/820,768, filed Jul. 28, 2006, which is incorporated by reference herein in its entirety.

BACKGROUND

The present invention is related to simulating programmable processors, and in particular, to a method and apparatus for modifying a provided virtual processor model for use in simulating a target processor running target software in hardware/software simulation.

By a virtual processor model is meant a model, e.g., presented as a set of software instructions that when executing on a host processing system implement a method of simulating the functionality of a programmable hardware processor ("target processor,") including simulating the timing and functionality of a set of target instructions ("target software") for operating that target processor.

Systems on a chip (SoCs) that include programmable processors are in widespread use, and using a virtual processor model is particularly advantageous in designing such SoCs. The processor design is often obtained as a pre-defined core design for use in designing a SoC.

Virtual processor models are detailed and therefore not trivial to design from start. As a result, vendors such as VaST Systems Technology Corporation of Sunnyvale, Calif., the assignee of the present invention, provide pre-defined virtual processor models for many popular processors.

Many SoCs however are designed to include a custom processor, e.g., one that might be similar to an available processor design, but have different word lengths, different operations, and so forth. There is a need in the art to be able to simulate the operation of such a custom processor using a virtual processor model, but yet custom design of a virtual processor model might not be warranted. Some processor types, however, contain many structures in common. Furthermore, processors tend to fall into families that have aspects in common.

There is a need in the art for a customizable virtual processor model, and for a method and apparatus for modifying a provided virtual processor model.

SUMMARY

Thus has been described a method of transforming a provided virtual processor model to a user virtual processor model. Also described herein is a tool, e.g., as instructions for operating in a host computer system for converting a provided virtual processor model to a user virtual processor model. Also presented herein is a method of specifying one or more characteristics of a target processor to transform a provided virtual processor model to a user virtual processor model that when operating in a c-simulation system, simulates the operation of the target processor. For example, presented herein is a method of specifying one or more characteristics of instructions to transform a provided virtual processor model to a user virtual processor model.

Described herein is a method of transforming a provided virtual processor model to a user virtual processor model to simulate a user target processor. The method includes accepting a provided virtual processor model, the provided virtual processor model for simulating a seed target processor, including implementing behavior and timing for a seed set of instructions of seed target processor, such that the simulation is both behavior and timing accurate. The method also includes accepting one or more user-provided descriptions of the user target processor model and also includes transforming the accepted provided virtual processor model to the user virtual processor model according to the user-provided descriptions.

The user virtual processor model has new and/or modified instructions, and/or modified behavior or timing for instructions, and/or modified processor structure in the form of a new or modified pipeline and/or a new or modified register compared to the seed virtual processor model. Furthermore, the behavior is implemented using binary translation of target code into host code, including caching translated target code for re-use during simulation of the user target processor.

In one embodiment, the one or more user-provided descriptions includes a description of a new instruction, including a description of an opcode pattern for a decoder part of the user virtual processor model to select the instruction, a description of behavior for the functionality of the instruction, and a description of the timing of the instruction.

In one embodiment, the behavior of the new instruction provides the host code for dynamically translating the new instruction into target code for execution during simulation of the user target processor.

In one embodiment, the description of timing of the new instruction is provided such that the timing is independent of the behavior of the new instruction.

In one embodiment, the timing is used to determine the number of clock ticks that the new instruction takes to execute when the target processor executes the new instruction as part of target code executing on the target processor.

In one embodiment, the target processor includes a target pipeline, the one or more user-provided descriptions includes a description of a user target pipeline, and the timing is determined in relation to the description of the target pipeline.

In one embodiment, the description of behavior of the new instruction provides the host code to which the new instruction is dynamically translated for execution during simulation of the user target processor.

In one embodiment, the description of the new instruction includes a mnemonic function describing the disassembly of the instruction for tracing the instruction.

In one embodiment, the method further includes providing one or more patterns to describe the decoding of the new instruction.

In one embodiment, the one or more patterns provide for describing how one or more fields are extracted from the new instruction when the new instruction is part of target code, the fields being extracted for one or more of determining timing and determining behavior.

In one embodiment, the description of behavior includes a description of a behavior function, and the description of the timing includes a timing function.

In one embodiment, the one or more patterns to describe how fields are extracted form an extract function for the new instruction.

In one embodiment, when the new instruction is simulated, the extract fields are passed in an extract structure to one or more of the behavior function and timing function.

In one embodiment, a pattern is provided using a combination of a first and a second symbol for bits that must be 0 and 1, respectively, and symbols for other fields, including any extract fields.

One embodiment further includes providing one or more patterns to indicate one or more exception patterns that describe exceptions to patterns.

One embodiment further includes building a decoder from the pattern definitions that include one or more exception patterns.

In one embodiment, the description of a user target pipeline includes one or more of the number of execution stages, and the delays between when one instruction needs register information, and when an earlier instruction makes such information available.

In one embodiment, the delays between when one instruction needs register information, and when an earlier instruction makes such information available, are provided as a vector that described when a result is available and when a result is unavailable.

In one embodiment, the seed target processor model includes a description of a seed pipeline, and a user has the option of re-defining of the seed pipeline to describe the user target pipeline, or of keeping the seed pipeline and adding a description of an additional pipeline as the user target pipeline.

In one embodiment, the provided seed virtual processor model includes a set of modules including a seed control module, a seed instruction set architecture module, and a seed decode module, and the transforming includes transforming the instruction set architecture module into a user set of one or more instruction set architecture modules.

One embodiment is a method of specifying one or more transformations for transforming a provided virtual processor model to a user virtual processor model. The method includes accepting a provided virtual processor model, the provided virtual processor model for simulating a seed target processor, including implementing behavior and timing for a seed set of instructions of seed target processor, such that the simulation is both behavior and timing accurate. The method further includes accepting one or more user-provided descriptions of the user target processor model and transforming the accepted provided virtual processor model to the user virtual processor model according to the user-provided descriptions. The behavior is implemented using binary translation of target code into host code, including caching translated target code for re-use during simulation.

One embodiment is a computer-readable carrier medium carrying a set of instructions that when executed by one or more processors cause the one or more processors to carry out any of the methods described above in this SUMMARY section.

Other embodiments, aspects, features, and advantages will be clear from the description and claims provided herein.

BRIEF DESCRIPTION OF THE DRAWINGS

FIGS. 21A and 21B show two different ADD instructions, one from the ARM™ instruction set and the other from the Motorola StarCore™ instruction set as examples used to illustrate one or more aspects of the present invention.

FIG. 23 shows Table 1 that describes elements of FIG. 22.

FIG. 24 shows an exemplary extract function for an exemplary instruction used to illustrate one or more aspects of the present invention.

FIG. 27 shows an exemplary mnemonic function for a MOV instruction according to an embodiment of the present instruction.

FIG. 29 shows a relatively simple exemplary behavior function that implements a simple register MOV type instruction, according to one or more aspects of the present invention.

FIG. 30 shows an exemplary behavior function of an implementation of a simple BEQZ instruction using a provided API function for the control module, according to one or more aspects of the present invention.

FIG. 32 shows Table 2 that gives an example of a few instructions and highlights the translate time and runtime elements for such examples, according to one or more aspects of the present invention.

FIG. 37 shows an exemplary pipeline delay table for the pipeline shown in FIG. 36, according to one or more aspects of the present invention.

FIG. 38 shows an example of a pipeline definition array for an exemplary pipeline, according to one or more aspects of the present invention.

DETAILED DESCRIPTION

Hardware/Software Simulation and Virtual Processor Models

Figure 1A:
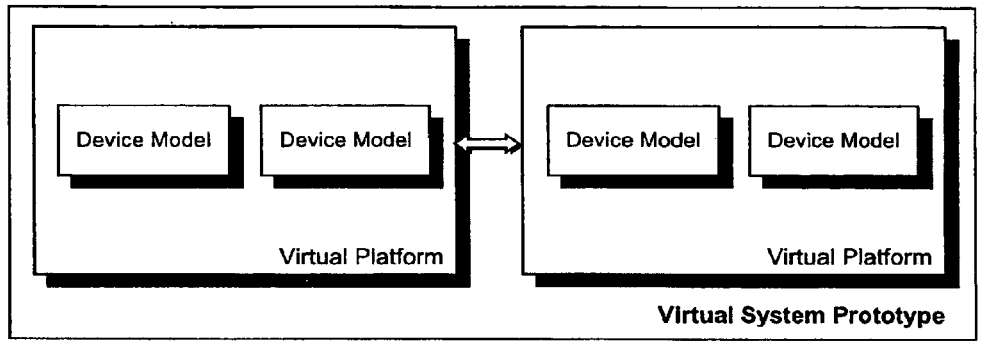
FIG. 1A shows a simplified representation of a simple virtual system prototype that includes two virtual platforms each including two device models.

By a Virtual System Prototype is meant a set of software instructions, e.g., a software system that when executing (running) on a host processing system simulate a hardware/software system that includes a processor ("target processor") and target processor memory, with the target processor memory including instructions ("target software") that is for execution on the target processor. By a hardware/software system is meant a system that includes a programmable processor, and the instructions—the target software—for operating that target processor. A hardware/software system, for example, may include a device, such as a mobile telephone, or a discrete component contained within a device. A hardware/software system may also include an installation, for example a mobile telephone base station. One aspect of the invention is for a virtual system prototype to provide a highly accurate and responsive model of such hardware/software systems. One can also develop a virtual system prototype to model the entire system, e.g., the mobile telephone together with the mobile telephone base station, and the communication pathway between them.

A virtual system prototype may be used to analyze the performance of the hardware architecture, develop and test target software, and examine the interaction between the hardware and software subsystems, before one builds the actual hardware.

Running a virtual system prototype is sometimes called hardware/software co-design, or simply co-design.

The elements of a virtual system prototype include device models. A device model is a virtual representation—a representation as software executing on the host processor system—of a hardware unit that is capable of providing input to a system or of receiving output from the system, or both. Examples of device models include timers, controllers, memories, and virtual processor models. Devices may be connected by busses, and a bus is represented by a bus model.

The models described herein are behavioral models that are timing accurate. A behavioral model provides the function of the device being modeled without necessarily providing accurate timing. Models can also be clock cycle accurate. Such a cycle accurate model is able to provide the state of the processor elements at any clock tick. For this, each clock cycle is simulated, and the model replicates the structures that are in the processor.

One of the challenges of simulating a hardware/software system is to have timing-accurate models that execute relatively fast on the host processing system. Behavioral models that do not provide timing accuracy can be relatively fast. On the other hand, clock cycle accurate models, e.g., structural models are either not particularly detailed in what they simulate, or run relatively slow in order to simulate a significant number of structural elements.

The processor models described herein that include aspects of the present invention provide full functionality, e.g., are full behavioral models, and further are timing accurate. For example, these models execute target code that is in a memory model with instruction and transaction time accuracy, useful, for example, in simulating interrupts and other interactions with other models. However, running such models does not necessarily include simulating all clock cycles. For example, if no significant events occur for a number of clock cycles, there is no need to simulate each and every one of those clock cycles.

Some of the methods for achieving such behavioral and timing accuracy with such speed are described in U.S. Pat. No. 6,230,114 titled HARDWARE AND SOFTWARE CO-SIMULATION INCLUDING EXECUTING AN ANALYZED USER PROGRAM, U.S. Pat. No. 6,263,302 titled HARDWARE AND SOFTWARE CO-SIMULATION INCLUDING SIMULATING THE CACHE OF A TARGET PROCESSOR, U.S. Pat. No. 6,584,436 titled HARDWARE AND SOFTWARE CO-SIMULATION INCLUDING EXECUTING AN ANALYZED USER PROGRAM, and U.S. Pat. No. 6,751,583 titled HARDWARE AND SOFTWARE CO-SIMULATION INCLUDING SIMULATING A TARGET PROCESSOR USING BINARY TRANSLATION. See also U.S. Patent Application 20060149526 titled CLOCK SIMULATION SYSTEM AND METHOD. These patents and patent applications are all assigned to the assignee of the present invention. The contents of each patent and patent application are incorporated herein by reference. For example, the virtual processor models described herein that include aspects of the present invention include dynamic binary translation of the target code. See above mentioned U.S. Pat. No. 6,751,583.

As used herein, a virtual system prototype has no ports, external connections or behavior. It is the top-level container for other modules. A virtual system prototype is the equivalent to what is called a test bench in a VHDL simulation system.

A virtual system prototype contains one or more virtual platforms, which in turn contain models of the actual devices or components contained within the system. All elements within the virtual system prototype are arranged in a hierarchy that generally reflects the structure of the actual hardware/software system.

The building blocks of a virtual system prototype are called Virtual Platforms herein, and contain the underlying models of the system. A simple virtual system prototype usually includes a single virtual platform, containing one or more virtual devices, however virtual platforms can have arbitrary complexity. Virtual platforms can include many hierarchies of subsystems, including other virtual platforms, virtual processor models that model the actual processor(s) and execute software embedded within the product, peripheral device models that emulate the functionality of the peripheral hardware devices, and interconnections. Virtual platforms can be interconnected.

FIG. 1A shows a simple virtual system prototype that includes two virtual platforms each including two device models.

Figure 1B:
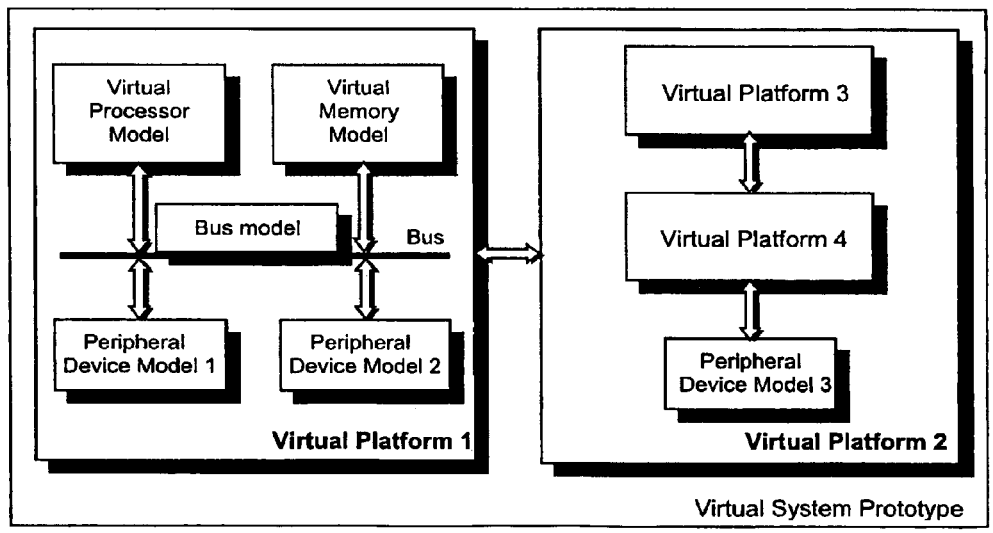
FIG. 1B shows a simplified representation of two virtual platforms, one of which includes a virtual processor model.

More complex virtual system prototypes may contain several levels of platform hierarchy combined with peripheral device models. One can interconnect virtual platforms in a variety of ways, including a network topology. FIG. 1B shows a first virtual platform 1 that includes a virtual processor model, a virtual memory model, peripheral device model 1 and peripheral device model 2 all connected by a bus. The bus is modeled by a bus model. Virtual platform 1 is connected to virtual platform 2 that includes peripheral device model 3 coupled to two other virtual platforms: virtual platform 3 and virtual platform 4.

While arrangements such as those shown in FIGS. 1A and 1B are in general prior art, when one or more aspects of the present invention are included, the arrangements shown are not prior art.

Any virtual platform can contain instantiations of other virtual platforms, which may, in turn, contain instantiations of other virtual platforms. As is commonly understood by those in the art, by instantiation is meant the creation of an instance of an object such as a module.

A virtual processor model simulates the behavior of a physical target processor running the target software written and compiled for that target processor. A virtual platform can contain one or more virtual processor models. A virtual processor model runs the actual target software executable that is designed for the physical processor. This means that one can develop and debug the target software, and execute the compiled target software on one's virtual system prototype, exactly as one would with a physical prototype.

Using a virtual processor model, one has greater control and flexibility than one has with an actual processor. With a virtual processor model one can selectively enable and configure cache and other internal processor resources, which might be impossible with physical processors. For example, one can configure properties of the memory management unit (MMU), including properties of the translation lookaside buffer (TLB), e.g., the number of TLB entries that store parts of the page table for translating between virtual and real addresses. One can also analyze the performance of one's target software on various configurations of the processor. One can swap virtual processor models in the prototype, and after porting the software to the new virtual processor model, compare suitability or performance of various processors.

Each virtual processor model interfaces to other devices using interconnections, such as bus connections, and asynchronous connections. The virtual processor models described are substantially capable of being instruction-cycle, bus-cycle, and register-cycle accurate. The effects of the virtual processor model on the virtual devices are accurately simulated.

Peripheral device models simulate the behavior of the physical devices in the hardware architecture, such as interrupt controllers, clock generators, asynchronous serial interfaces, etc. Device models can connect directly to other device models, or interface to virtual processor models using interconnections, such as bus connections, and asynchronous connections.

One can use proprietary (pre-built) device models in a virtual system prototype or build one's own. Most peripheral devices are unique for each platform and must be developed to suit the architecture.

A Virtual Interconnection represents a hardware connection (or interface) that allows communication between a virtual platform and other virtual platforms and between peripheral device models within a virtual platform. A virtual system prototype may contain several types of interconnections, such as:

Asynchronous connections (i.e. logic signals such as interrupts).

Clock connections (predictable repetitive synchronous signals).

Bus interconnects (a group of signals that move transactions between devices).

Network interconnects (i.e. a protocol on the physical layer of the network).

Serial connections.

Implementing an interface speeds one's development process. By modeling the minimum functionality and timing behavior of each interface, execution of the model is fast and efficient. As the development of one's virtual system prototype progresses, one can add more detail to the various interfaces in the prototype. While more detail may increase execution time, it also provides additional verification of specific components in one's architecture.

Figure 2:
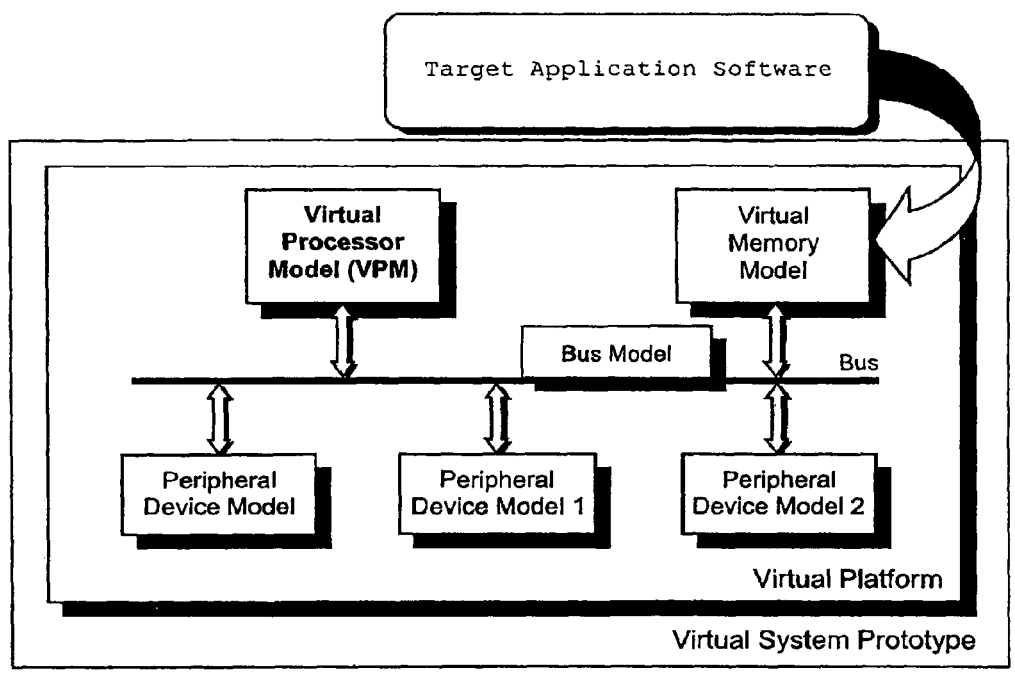
FIG. 2 shows in simplified block diagram form a virtual system prototype that includes a virtual platform that has a virtual processor model simulating a target processor, and a virtual memory model.

FIG. 2 shows in simplified block diagram form a virtual system prototype that includes a virtual platform that has a virtual processor model simulating a target processor, and a virtual memory model. The virtual memory model includes target application software that is for execution by the virtual processor model so that the virtual system prototype simulates a system that includes a target processor, memory modeled by the virtual memory model, a first peripheral device modeled by peripheral device model 1, and a second peripheral device modeled by peripheral device model 2. The elements are interconnected by a bus modeled by the bus model. While a system such as shown in FIG. 2 is in general prior art, a system such as shown in FIG. 2 with a virtual processor model that includes aspects of the present invention is not prior art.

A test bench allows one to interact with the various components of a virtual system prototype during execution. With a test bench one can emulate the human interaction and/or external signals that the system will encounter in the physical world. A test bench can contain performance and analysis tools. One can use a test bench to test the entire virtual system prototype, individual virtual platforms or individual device models.

A test bench is usually (but not necessarily) instantiated at the top of the hierarchy.

Figure 3:
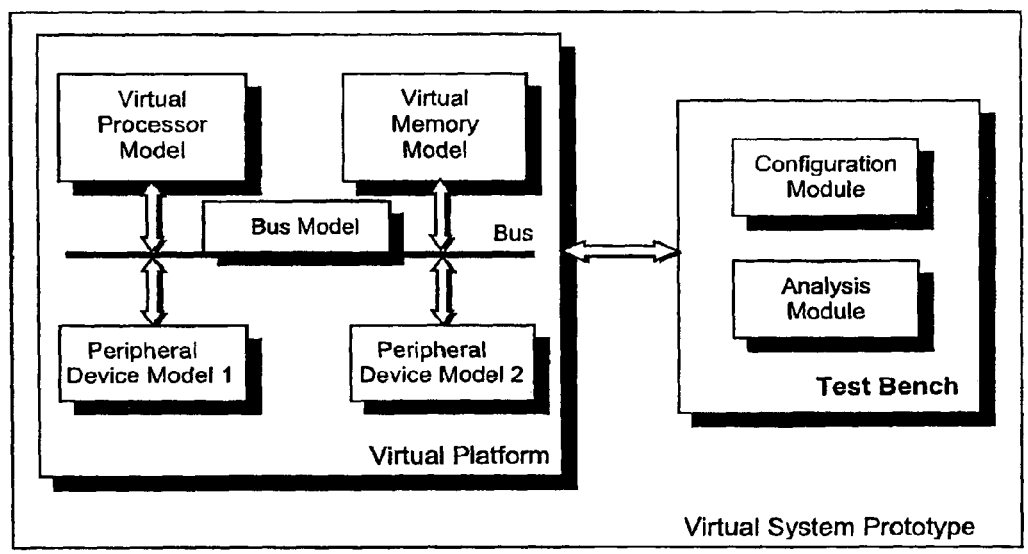
FIG. 3 shows in simplified block diagram form an example of a test bench in a virtual system prototype.

FIG. 3 shows in simplified block diagram form an example of a test bench in a virtual system prototype. The test bench shown includes an analysis module and a configuration module. While a system such as shown in FIG. 3 is in general prior art, a system such as shown in FIG. 3 with a virtual processor model that includes aspects of the present invention is not prior art.

Executing the Virtual System Prototype: Event Driven vs. Clock Driven Simulation When one's virtual system prototype is complete, one can execute it as a complete functioning model of the physical system. A virtual system prototype uses an execution engine—a scheduler—during execution.

A virtual processor and other models in a virtual system prototype can be event driven. This is called event driven simulation. For example, a response, such as one model communicating an event to another model can be scheduled to occur upon the event occurring. The communicating of the event in time requires the simulation time to move to the time of the event, and then make the communication to the other model.

The execution engine, the virtual processor and other models described herein can be not only event driven, but also clock driven. One can schedule actions based on clock events as well as other events, providing greater versatility and efficiency. This means that, for example, there is a way to schedule an action based on clock signals. For example, there is a way to schedule an action to occur a number, e.g., N of clock ticks into the future. This is in contrast with hardware simulators such as SystemC that rely totally on event driven simulation. With SystemC, the only mechanism to communicate an event at a point in time is to move the simulation time to that point in time, and then carry out any communication associated with the event.

Virtual platforms, virtual processor models, peripheral device models, and test benches are defined in modules. Modules are the building blocks of a virtual system prototype.

A module describes the hierarchical structure, interconnection, functionality, and behavior of the hardware element that it represents. Each module generally (but not necessarily) describes a single hardware subsystem. Modules can be instantiated within other modules.

Figure 4:
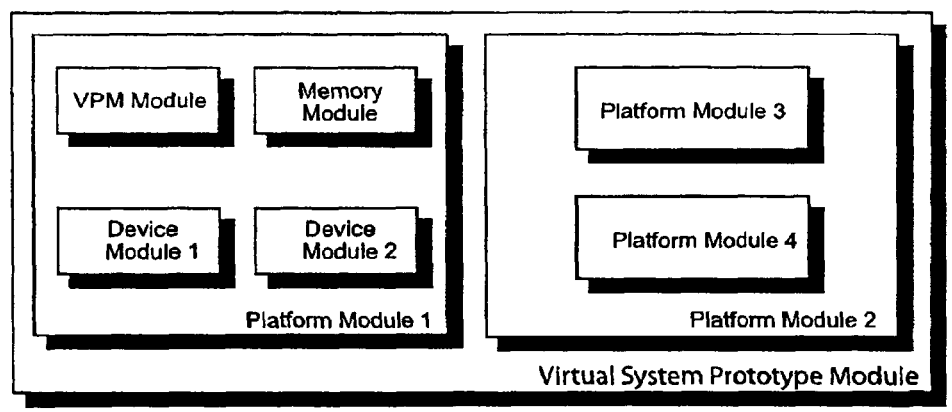
FIG. 4 shows in simplified block diagram form an example of a virtual system prototype—itself a module—with a hierarchy of other modules.

FIG. 4 shows in simplified block diagram form an example of a virtual system prototype—itself a module—with a hierarchy of other modules. While a system such as that shown in FIG. 4 is in general prior art, a system such as that shown in FIG. 4 with a virtual processor model that includes aspects of the present invention is not prior art.

One can build one's own modules to describe the specific hardware subsystems of one's model, and use them in conjunction with proprietary or otherwise pre-defined modules. Such pre-defined modules of fully functioning models may be provided for standard devices, such as virtual processor model modules, and other device modules. Described herein are user modifiable virtual processor model modules that include aspects of the present invention.

Figure 5:
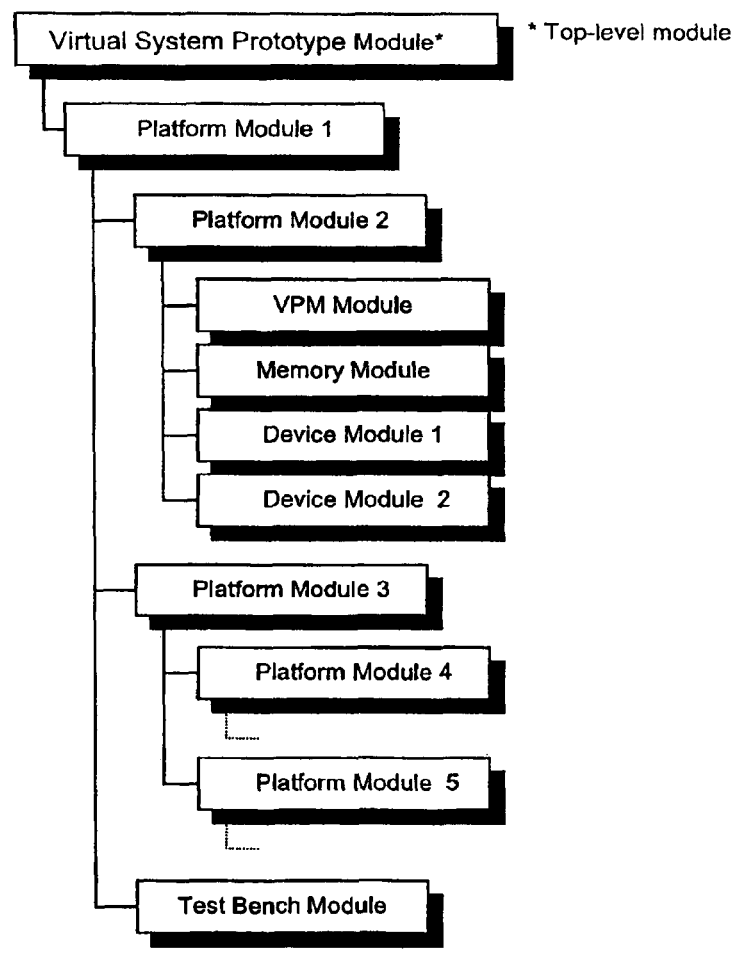
FIG. 5 shows a tree structure representation of a hierarchy of modules.

All modules in a virtual system prototype are arranged within a hierarchy. For a virtual system prototype with many modules, the module hierarchy is more easily represented as a tree view, where platform modules are branch nodes, and device modules are leaf nodes. FIG. 5 shows one representation of a hierarchy as a tree structure. While a system such as that shown in FIG. 5 is in general prior art, a system such as that shown in FIG. 5 with a virtual processor model that includes aspects of the present invention is not prior art.

The form of any module—a platform module or device module—is essentially the same, and all modules are constructed in a similar manner. They differ only in that a platform module usually defines a hierarchy that instantiates other modules but does not contain any behavioral functionality, while a device module contains behavioral functionality but does not instantiate other modules. However, note that this definition is arbitrary. The methodology described herein is flexible and one can build modules in a variety of configurations to suit any architecture.

The virtual system prototype itself is also a module that defines the start of the hierarchy. This top-level module differs from other modules in the hierarchy in that it does not contain any external connections.

The representation of a model as a set of hierarchically connected modules provides a clear separation between one device model and another. It also provides flexibility and allows for module re-use.

In one implementation, modules are defined with a module type name, and instantiated with an instance name. One can instantiate the same module any number of times, and at any level of the hierarchy within the virtual system prototype.

In one implementation, modules also support versioning. One can develop several versions of the same module and selectively instantiate specific versions within the virtual system prototype.

A module includes two parts: (1) its characteristics and (2) its behavior. All modules require a definition of their characteristics, however not all modules require a behavioral definition. For example, platform modules do not require a behavioral definition.

The module characteristics define the characteristics of the module, and how the module interconnects with other modules within the virtual system prototype. Such characteristics include, but are not limited to:

The ports that define the inputs and outputs of the module.
The nets that the module uses internally.
The entry-point functions for the module.
The tasks that define the module behavior, if applicable.
The parameters or properties of the module.
The instantiation of other modules, including port connections, and parameter overrides, if applicable.

Module behavior is defined as tasks that mimic the functionality of the device that the module represents. In one implementation, one can use C, C++ or Assembler to define the behavior of a module. One can use standard language constructs within the software, and call-back functions to define the interaction of the module with other modules in the virtual system prototype.

Note that the module behavior and the module characteristics are not necessarily synonymous with the model structure as in what is called structural modeling of a module. Such structural modeling replicates the structures that are in the device being modeled by the module. Using such modeling has many implications, including on how the model is partitioned. Such models, e.g., in the case of virtual processor models also run slower than do the virtual processor models described herein that use timing accurate behavioral modeling.

A module is ready for use in the virtual system prototype when it is compiled and built into a loadable code. In one implementation on Microsoft WINDOWS, each module is compiled and built as a DLL. Each DLL usually contains a single module. The CoMET™ toolset, made by VaST Systems Technology Corporation of Sunnyvale, Calif., the assignee of the present invention, includes a graphical interface for defining module characteristics, an editor that one can use to write module behavior, and the tools for developing, testing, debugging, compiling, and building one's own module DLLs. CoMET also provides a development environment in which one can develop, test and debug all device modules concurrently.

One can add pre-defined, e.g., proprietary module DLLs, e.g., for fully functioning models of standard devices, such as virtual processor models to the virtual system prototype without modification.

In one implementation, when the virtual system prototype begins execution, each module DLL is loaded into the same address space as the virtual system prototype and runs as a functioning model of the physical sub-system that it represents.

Some pre-defined modules allow one to modify some of the structural elements (a feature that one can also add to one's own modules), so that one can fine-tune each instantiation of a module to suit the design or architecture.

Complete virtual processor models are in general very difficult to build. One aspect of the present invention is modifying the characteristics and behavior of a provided virtual processor model in order to produce a customized virtual processor model.

In the description herein, and in a software implementation of a simulation system that includes aspects of the present invention, an identifier provides an element, such as a module or module port, with a unique name so that it can be referenced.

Each module has a name that identifies its module type. When one instantiates a module, identified by its type name, one creates a named instance of that module type. All modules can instantiate other modules, which can in turn instantiate other modules to form a module hierarchy. One can instantiate a module multiple times within the module hierarchy, including multiple instantiations within the same parent module.

Each module instance has a path name that is composed of the instance names of its parent, grandparent, etc. One can uniquely reference any module instance in the hierarchy by using the path to the instance, and the instance name.

When the virtual system prototype is executing, modules receive information from, and send information to other modules. Ports and nets provide the mechanism by which information, e.g., data is transferred between the modules in the virtual system prototype. Ports and nets are named by an identifier.

A module communicates with its environment through its module ports. A module port provides an interface for the module; it is a connection point for connecting a module instance to other module instances in the platform hierarchy.

If a module is instantiated within another module, it can connect directly to the module ports of its parent module. In turn, the parent module can connect directly to the ports of its parent module, providing a communication pathway through the module hierarchy.

If a module contains two instantiations of the same module type, each instance can connect to different module ports of its parent module.

Note that the top-level module (usually the virtual system prototype module) does not contain module ports.

As used herein, a net represents a physical connection between module ports. A net is analogous to a wire, which provides a pathway for information that passes between module ports. Nets do not store values, but simply transmit all values that are generated by their drivers (sources of the information).

When a module port is connected directly to a port in its parent module, the net that connects the two ports is implicit. In other words, one does not have to declare the net, simply connecting the ports creates the net. However, to connect the ports of two (or more) modules at the same level in the hierarchy, one must explicitly declare a net within their parent module. One can then connect the ports of the modules to the declared net, which provides a communication pathway between the modules.

Figure 6:
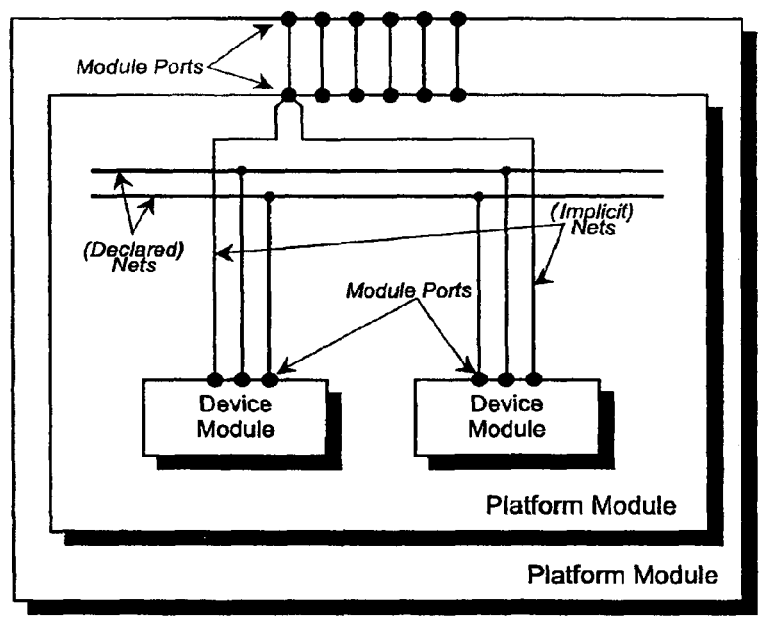
FIG. 6 shows a simple example of a platform module that has nets and ports including declared nets and implicit nets.

FIG. 6 shows a simple example of a platform module that has nets and ports. There are declared nets and implicit nets.

If a module transmits information onto a net, all other modules that have a direct port connection to the net will receive the information.

Note that each module port can have only a single connection within its parent module. One can connect a module port to either a declared net within its parent module, or to a module port of its parent module (but not both).

In one embodiment, one cannot connect a declared net to a module port of the module that contains the declared net.

Module ports and nets have many similar characteristics. The basic difference is that a module port is visible outside of its module, whereas a net is not.

Both nets and module ports have an associated net type. The net type determines the kind of information, that is, data that the net can carry between the module instances, and the type of information that the module ports can accept. Nets and the module ports to which they connect must be of the same net type.

The simulation system described herein supports the following in-built net types: logic class, bus net, clock net, and vector 32 net. There is also a Connect net type used herein to indicate connection of modules.

There is no distinction at a connectivity level between a bus net, a logic net, and a clock net; they simply represent module ports that are interconnected with nets. This facility allows one to create one's own logic net types, and to extend the available net types, with the exception of the clock net. For example, one can extend the bus net type to include any type of bus, network or serial link connection. Provided that the new (extended) net type is compatible in a physical protocol sense with an existing net type, then one can build a bridge connecting the two net types, which will at a transaction level model the exact behavior of the new net type.

The logic class (Logic) allows one to derive one or more logic net types. A logic net type derived from the logic class can have a maximum of 16 values. For example, tri-state logic nets can take on the logic values 0, 1, and high impedance (indicated as Z). Other values also may be defined.

All modules that connect to a bus require a bus net, defined with the net type called StdBus. Systems with a multi-layered bus require a bus net for each layer. Each bus net requires a module called a protocol engine that defines the protocol for each module connected to the net. All master devices and slave devices that are connected to the bus net use the protocol engine to interpret the bus protocol.

A clock net, defined with the net type called Clock herein, provides a clock input for modules that must be synchronized. A clock net provides an edge that one can use to schedule events. A clock net provides a simple method for a task to track system time. One can connect the task to a clock net as a slave and wait on any number of clock tics. One's task software can ignore the clock period and time units.

The value of a clock net is a 32-bit integer that defines the clock period in picoseconds (10-12 sec).

A simulation system as described herein includes a scheduler processes the clock net and automatically reschedules events if a clock net period changes. If the frequency of the net changes while one's task is waiting, the wait is adjusted so that the appropriate number of tics elapse. In other words, one's task remains synchronized with the clock net.

For more information about using a clock net, see abovementioned incorporated-by-reference U.S. Patent Application 20060149526 titled CLOCK SIMULATION SYSTEM AND METHOD.

Module ports and nets have width. A module port or net declaration without a range specification is 1 bit wide and is known as a scalar. Multiple-bit nets are known as vectors, and are declared by specifying a dimension.

Each module has two entry-point functions: a module instance initialization function, called when the virtual system prototype begins execution), and a module instance exit function (called when virtual system prototype begins shutting down.

The functionality, or behavior of a module is defined in the implementations described herein by tasks. A module can contain one, or more task instances. When the virtual system prototype begins execution, all task instances are invoked concurrently, and begin executing immediately.

Each task has three entry-point functions: a task instance initialization function, called when the virtual system prototype begins execution, a task instance function, called when initialization is complete, and a task instance exit function, called when virtual system prototype begins shutting down.

Figure 7:
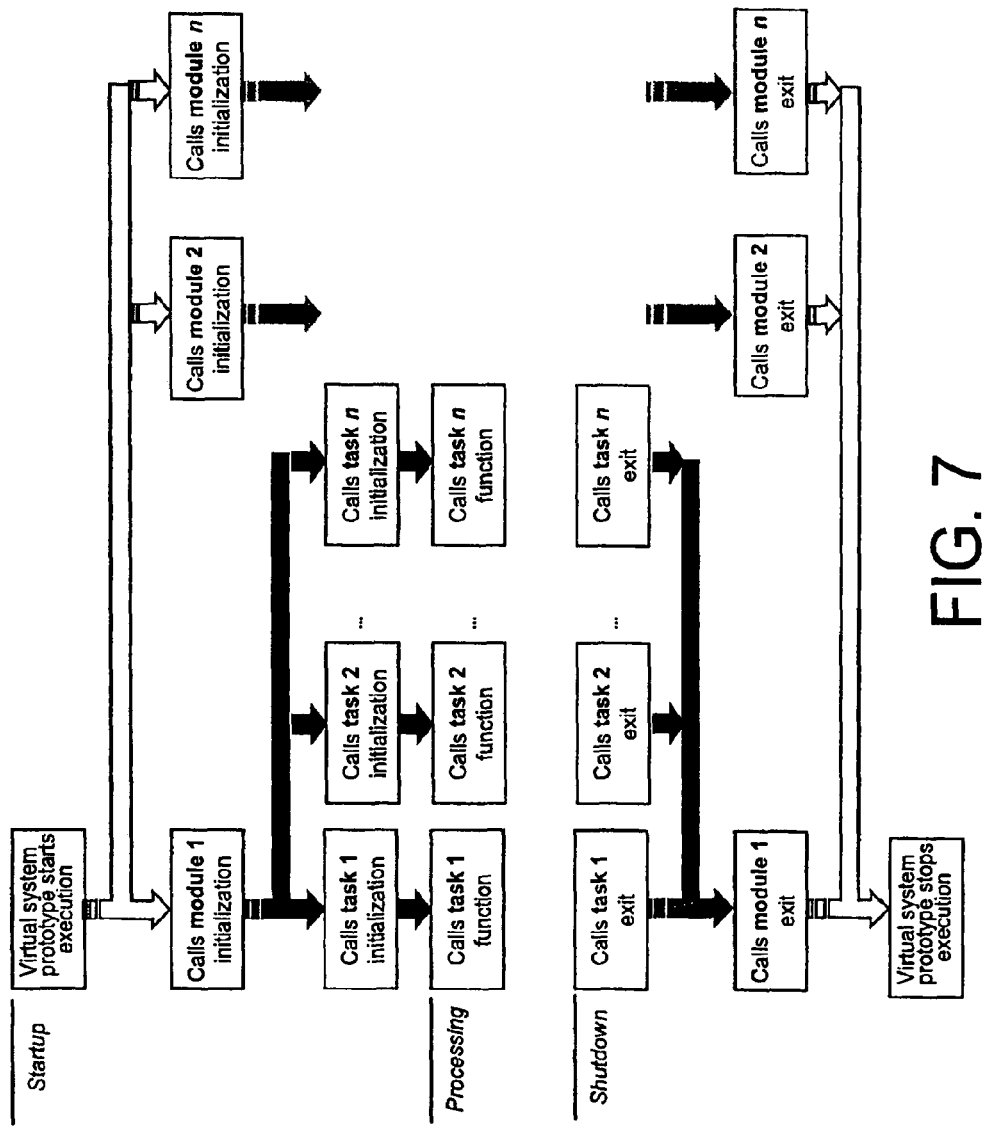
FIG. 7 illustrates a sequence of execution for all modules and tasks within a virtual system prototype in simulation system implementations that operate with a virtual processor model that include aspects of the present invention.

FIG. 7 illustrates the sequence of execution for all modules and tasks within a virtual system prototype in simulation system implementations that operate with a virtual processor model that include aspects of the present invention. Note that the initialization functions for all modules are called before the modules' task initialization functions, and all task initialization functions in all modules are called before the task functions.

Introduction to the VPM

A virtual processor model (VPM), in a simulation environment including a simulation engine, performs much of the functionality that a real target processor, e.g., a real processor core performs. As well as this, the virtual processor model also interfaces to the simulation engine, and provides interfacing for the purpose of extracting tracing and timing information, e.g., via a test bench.

The virtual processor model performs functions including:

Loading and execution of target instructions as produced in a binary image.

Interfacing to a bus model called StdBus herein.

Interfacing to any logic, clock and vector net types in order to respond to the primitive net functionality as a representation of the actual core being modeled.

Providing an accurate behavioral model with accurate timing of such internal structures such as any cache(s), TLB(s), pipeline(s), co-processor(s), internal RAM(s)/ROM(s), and so forth.

Providing tracing capability, e.g., via a test bench, for the purpose of analysis of function and timing.

Figure 8:
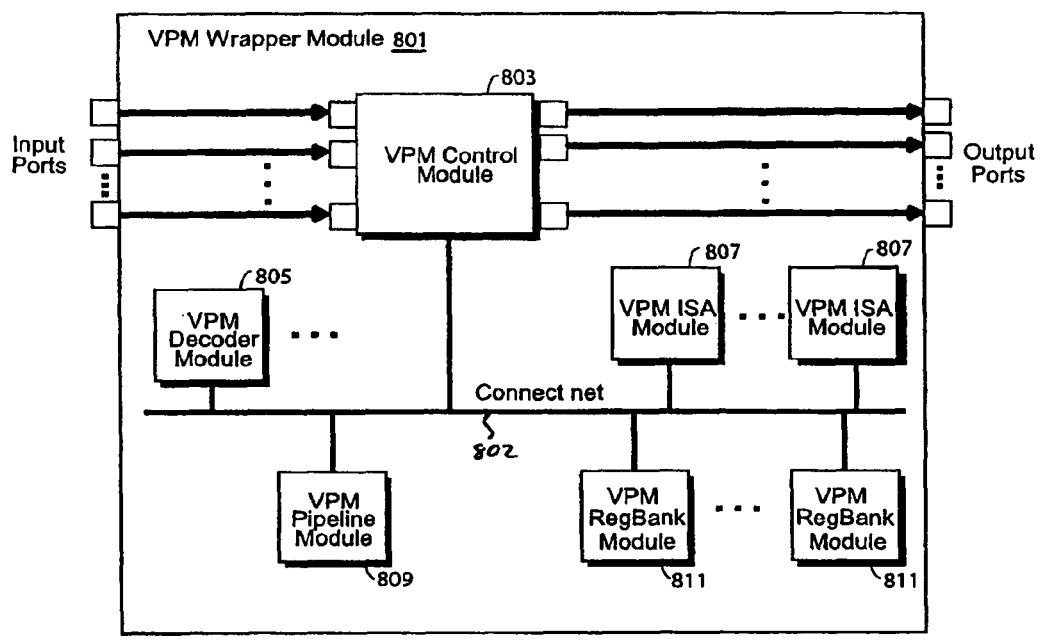
FIG. 8 shows the architecture of a virtual processor model that includes a set of modules. A transformable version includes aspects of the present invention.

In one embodiment, a virtual processor model includes at least six types of modules, each of which are dedicated to a specific set of tasks. FIG. 8 shows a virtual processor model with these six modules and their relationship. There is a single net, a connect net that connects together these modules. In one embodiment, in a software implementation, each of these components is provided in the form of a pre-built .dll. The virtual processor model 800 shown is made up of modules that include a control module 803, a decoder module 805, one or more instruction set architecture modules 807, one pipeline module 809, and one or more register bank modules 811. These modules are all in a virtual processor model wrapper module 801 that defines the modules that define the entire virtual processor model 800, and their interconnection.

The virtual processor model control module 803 provides the following device specific functionality of a virtual processor model 800:

All control related functionality relating to simulation.

Bus interfaces.

Cache subsystems.

MMU subsystem(s), including TLB(s).

Target code loading.

Control and interfacing to the simulation system and infrastructure.

Virtual processor model API handling, e.g., for handling transformations of transformable virtual processor models according to one or more aspects of the present invention.

In one embodiment, the virtual processor model control module is supplied as a pre-built .dll.

The virtual processor model decoder module 805 is responsible for decoding fetched binary instructions and mapping these to the instruction definitions in the ISA module(s) 807 that define(s) the instruction set(s). This module models the actual decoder present in the core processor—the target processor—being modeled. In one embodiment, the decoder module 805 contains a table of behavior, timing functions and mnemonic functions that form the basis for instruction execution. For a target processor family, there can be more than one decoder module, for example, there can be one decoder module per instruction set, e.g., for the ARM family of processors, that can be one for the Arm32 processor, one for the "Thumb"™ processor, and so forth. In one embodiment, the virtual processor model decoder module 805 is supplied as a pre-built .dll.

The virtual processor model ISA module(s) 807 define(s) the instruction set, or instruction sets that the virtual processor model 800 will reference for execution of the behavior of an individual instruction of target code. In one embodiment, such behavior includes not only functionality, but also timing, mnemonic representation, and so forth. It can be thought of as the body of the functions that are referenced by the virtual processor model decoder module 805. There can be multiple ISAs in a virtual processor model 800. In one embodiment, the virtual processor model ISA module(s) 807 is/are supplied as a pre-built .dll(s).

The virtual processor model pipeline module 809 defines the pipeline of the target processor. This module configures the pipeline hardware model and hence defines the timing of instructions throughput and accurately models pipeline stalls and interlocks. There typically is exactly one pipeline module in a virtual processor model module.

Each virtual processor model register bank module 811 defines a register set of the real target processors being modeled. The register set in this case includes the available registers, R0,R1,PC and so forth, that are available in that particular target processor. In one embodiment, each VPM register bank module 811 also configures the register sizes, names and attributes of the registers in the set being modeled.

The virtual processor model wrapper module 801 defines the contents and version numbers of the modules that define an entire virtual processor model. The connections made are not functional and are not used for data transfer in any way. As such the connections do not represent data flow. The connections are made in order establish the presence of specific sub modules. In one embodiment, the VPM wrapper module 801 is normally supplied as a pre-built .dll. However, when the virtual processor model is transformable according to aspects of the present invention, the VPM wrapper module 801 is provided in a source format for module definitions, as module definition file having a .fmx extension in one implementation, in order to provide for adding user-defined modules to the virtual processor model design.

Figure 9:
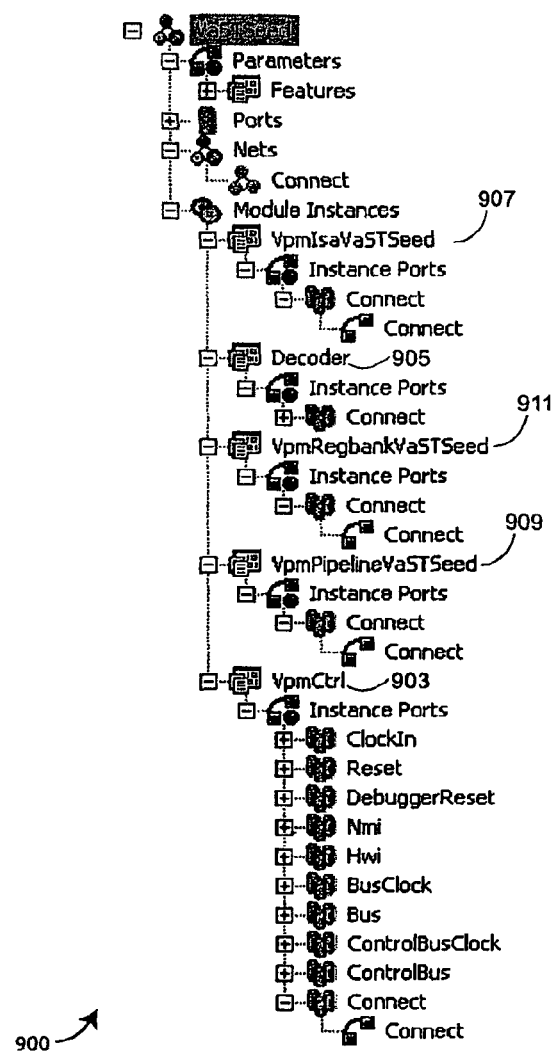
FIG. 9 shows an example of a tree view of VPM modules, connected together in the VPM wrapper module. A transformable version includes aspects of the present invention.

A "connect" net is the mechanism by which, in one embodiment, modules in a virtual processor model wrapper module can be linked together. FIG. 9 shows an example 900 of a tree view of VPM modules, connected together in the VPM wrapper module. In FIG. 9, 903 is the control module, 905 is the decoder module, 907 is an ISA module, 909 is a pipeline module, and 911 is a register bank module. Note that the control module has several ports, including to debugging. All modules include a connect net port for the connection.

Transformable Virtual Processor Model

One aspect of the present invention is a transformable virtual processor model, and a process for transforming a provided virtual processor model. The transforming process starts with a provided "seed" virtual processor model that includes the appropriate project infrastructure to allow the user to build a modified virtual processor model that has new and/or modified instructions, and/or modified behavior or timing for instructions, and/or modified processor structure such as pipeline and/or registers.

A provided seed model represents a fully functional virtual processor model that is transformable. A virtual processor model transformer tool is provided to aid the modification process. The seed model typically represents a specific target processor family member, and includes all aspects of its core functionality, such as cache(s), memory management unit (MMU) including any TLB, internal memory, and so forth. Typically, some aspects of the provided seed virtual processor model are non-transformable. For example, a seed model representing a specific target processor that is a specific member of a processor family, e.g., ARM family of processors, can be transformed into another family member, provided that differences between the specific target processor and the other family member to which the seed virtual processor model is transformed involve only user transformable components.

The transformable components associated with a transformable virtual processor model include one or more of: decoder module(s), ISA module(s), pipeline module, and register bank module(s). Thus user module(s) replace corresponding provided seed module(s), except that in the case of ISA module(s), the user can keep the existing seed ISA module(s) and extend them via the addition of extra modules or indeed can entirely replace the seed versions.

Each user module can be viewed as a separate project that has the ability to transform the original seed model.

Specifying/Defining Instructions

Associated with each target processor instruction are a set of attributes that in one embodiment are implemented as functions.

When a target processor fetches an instruction there is first a decode phase in order to establish which instruction has been fetched. What the instruction does—its functionality—is the behavior of the instruction. The execution of an instruction takes a defined time to execute, normally expressed in processor clock ticks. This is the timing of an instruction, and depends on the architecture of the pipeline and so forth. In one embodiment, a virtual processor model directly mirrors decoding. The decoder module allocates the instruction to be called. A defined behavior of the instruction executes the functionality of the instruction, and a timing function specifies the execution time, e.g., in clock ticks.

In an actual target processor, the decoder hardware selects a particular instruction based on the opcode. In one embodiment of a virtual processor model, it is the control module that uses a set of attributes that define an instruction, e.g. implemented as functions. The VPM decoder module, built by the user or provided as a seed, configures the control module to allow it to call the correct functions when a binary instruction is decoded.

An instruction in one embodiment is defined for a VPM by the following attributes. One embodiment processes each of these as a function.

Opcode pattern: as used herein, this pattern is the opcode pattern used by the decoder module to select the instruction.

Behavior: behavior as used herein is the functionality of the instruction. As described further below, this is defined by host code that the instruction will be dynamically translated to.

Timing: the timing of the instruction is in one embodiment how many clock ticks are required to carry out the instruction when the target processor executes the target code. Alternate embodiments provide timing in alternate forms, e.g., other timing quantities such as instruction cycles, time measure, and so forth. The timing, of course, depends on such resources as the target processor pipeline, which pipeline registers are read in, what stage the pipeline is in, and so forth. In one embodiment, the defining of timing defines what resources such as a target pipeline are used in implementing the instruction, and at what stage of the instruction the resources are used. The determining of timing uses a provided description of the target pipeline. One aspect of the invention is the capability of specifying and modifying the timing of an instruction independent of specifying and modifying the behavior of the instruction.

Mnemonic function: this in one embodiment is the disassembly of an instruction, and used specifically for tracing an instruction for later analysis. There is no analogous function in an actual target processor to the mnemonic function. The control module calls the mnemonic function when a test bench is enabled in order for the operators of the instruction to be output to a trace file.

The Transformable Modules

Figure 10:
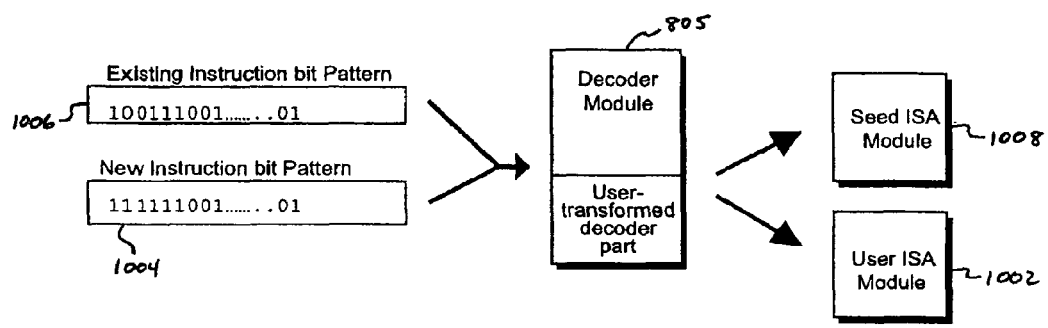
FIG. 10 shows by a simple example a modified decoder module when a new instruction is added to the instruction set of a seed virtual processor model according to an embodiment of the present invention.

In one embodiment, a transformable virtual processor model includes a single decoder module. In alternate embodiments, more than one decoder module can exist, e.g., for additional instruction set architecture (ISA) module(s). In one embodiment, the seed model provides a file for the existing instruction decode to re-create the existing (seed) decoder module and to provide a decode function for all instructions provided for a particular target processor. This provided decode function is modifiable by the user to 1) create additional decode capability for the purpose of adding new instructions and/or 2) to modify the decode for a particular bit pattern, e.g., for the user to replace existing instructions. The user can also replace the entire decoder and re-specify the bit patterns and instructions that are to be decoded. FIG. 10 shows by a simple example the modified decoder module when a new instruction is added to the instruction set of a seed virtual processor model. Note that in one embodiment, the user decoder module may have ports and parameters associated with it.

Figure 11:
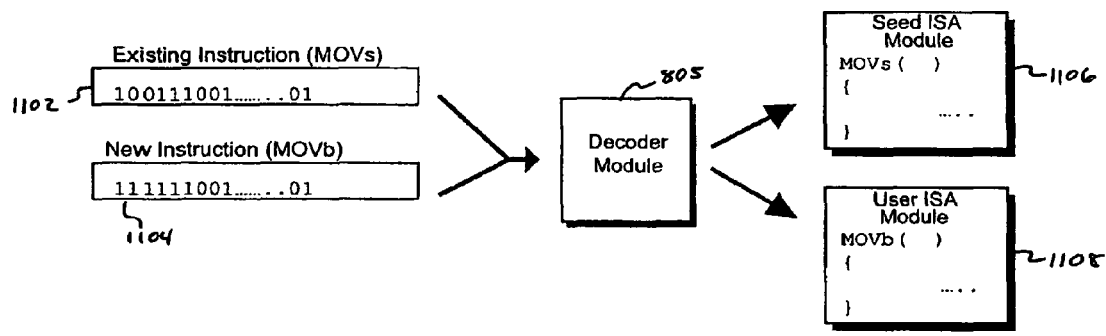
FIG. 11 shows by way of a simple example an ISA module representation for a new instruction and a modified existing instruction according to an embodiment of the present invention.

There can be multiple ISAs in a virtual processor model design. The ISA modules are effectively the destination for the decoder module in that the decoder will individually decode to an instruction definition contained in a function in the ISA. A seed model virtual processor model includes one or more seed ISAs that contain the functionality of all the instructions available to a particular target processor. If the user wants to change the behavior/timing of an existing instruction whilst maintaining the decoder as is, the user would build an ISA module which would contain this new behavior/timing. The ISA module is the container for this new behavior. FIG. 11 shows by way of a simple example the ISA module representation for a new instruction and a modified existing instruction.

In the example shown in FIG. 11, the user has re-implemented the MOVs instruction and has created a new instruction MOVb. The existing functionality of the MOVs instruction is contained in the seed ISA module. However the user can build an ISA module that contains a replacement, and essentially rebuild the decoder to point to the user's new implementation.

In the case of adding a new instruction, the user would modify the definition of the decoder module and would define new instruction behavior/timing for the MOVb inside the user ISA module, and further, one for the MOVs instruction. In one embodiment, the user ISA module may have ports and parameters associated with it.

With regard to the user transformable pipeline module that describes the target pipeline of the target processor, the user has the ability to define the target pipeline in terms of the instruction timing of the instruction. In conjunction and during interaction with the ISAs, this forms the configuration of the main timing component of the virtual processor model. This allows the user to change timing behavior with regards to individual instruction execution within the target pipeline. The user pipeline module contains the definition of the user target pipeline such as number of execution stages, and the delays between when one instruction needs register information, and when an earlier instruction makes such information available. The virtual processor model control module provides the user with a timing API to interact with when defining the instruction timing with regards to interlocks and so forth. In one embodiment, the pipeline module provides a definition/configuration of the actual hardware pipeline, and does not contain any functionality itself except via the definition.

Figure 12:
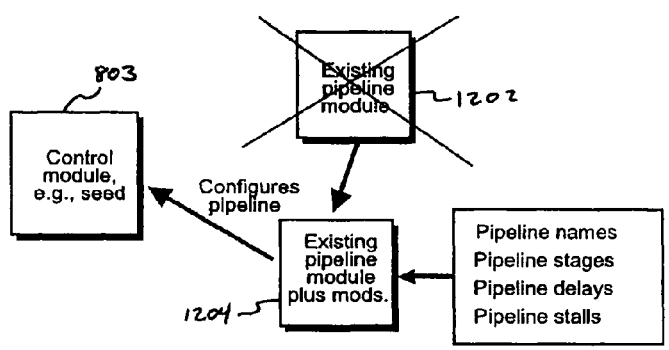
FIG. 12 shows how an existing pipeline module is modified to become the modified pipeline module, and is used by the control module to configure the pipeline model by specifying or modifying one or more of the pipeline name(s), the pipeline stage(s), the pipeline delay(s), and the pipeline stall(s), according to an embodiment of the present invention.

In one embodiment, there is only one pipeline module in a virtual processor model. An aspect of the invention is that the user has the option of re-defining of the existing pipeline, or of maintaining the original seed pipeline. In one MS Windows version, the source code is provided for the build of the seed pipeline .dll and the user can essentially modify the seed with changes to such provided source code. FIG. 12 shows how an existing pipeline module is modified to become the modified pipeline module, and is used by the control module to configure the pipeline model by specifying or modifying one or more of the pipeline main and stage name(s), the pipeline stage(s), the pipeline delay(s), and the pipeline stall(s), according to an embodiment of the present invention.

Figure 13:
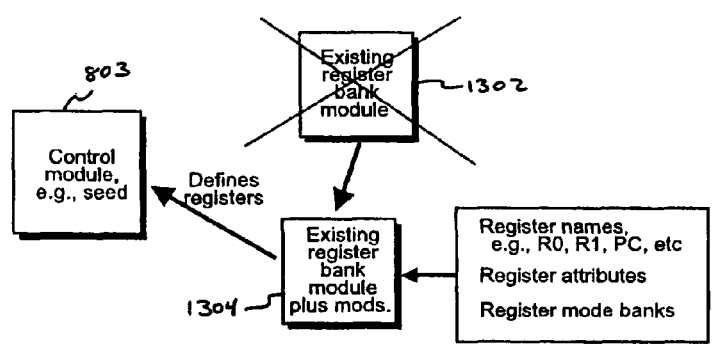
FIG. 13 shows modification of a provided register bank module with a modified register bank model by modifying or adding one or more of the register names, the register attributes, and the register mode bank, according to an embodiment of the present invention.

With respect to the user transformable register bank, in one embodiment, the user has the ability to define the register bank module for simulating a particular target processor. In conjunction and in interaction with the ISAs and control modules, this forms the main configuration of the register bank model available for use by the processor being modeled. The seed virtual processor model includes a seed register bank module that defines the register set for the specific processor of the seed. The user can re-define this register bank by adding registers to this set. In one embodiment, registers cannot be removed from the seed model as the control module provided with the seed requires the seed register set, and such control module in one embodiment is non-transformable. In one embodiment, the register bank module provides a definition/configuration of the actual hardware register set, and does not contain any functionality itself, except via the definition. There can be a plurality of register bank modules in a virtual processor model. The user has the option of re-defining the module, in terms of additional registers, or maintaining the original seed register bank as is. For example, the user can add co-processor registers to the existing (seed) register set. In one MS Windows version, the source code is provided for the build of the seed register bank .dll and the user can essentially modify the seed with changes to such provided source code. FIG. 13 shows the modification of a provided register bank module with a modified register bank model by modifying or adding one or more of the register names, the register attributes, and the register mode bank.

The transformable virtual processor model wrapper module 801 defines the connections and instantiations of the individual virtual processor model components (See FIG. 8). This model defines the instantiations via a standard .fmx file and can be used to connect user ports to the exterior interface of the virtual processor model. A virtual processor model wrapper is provided as part of the seed model, however the user is free to add or remove ports accordingly.

Currently, only ports of type "Connect" "StdLogic" and "StdVector" "StdClock" are supported for addition in any module. Hence, these net types can be manipulated in the virtual processor model wrapper. Port type "StdBus" requires API protocols which are associated with the virtual processor model Control module and hence are not supported due to the control module not being directly transformable.

The transformable virtual processor model wrapper can be seen as a sub-platform definition of all the modules in a virtual processor model design.

Specifying the Functions that Define Instructions

Extract function: as used herein, the extract function extracts the operands of the instruction, decodes as necessary, and passes any operands to the behavior function for the instruction.

Figure 14:
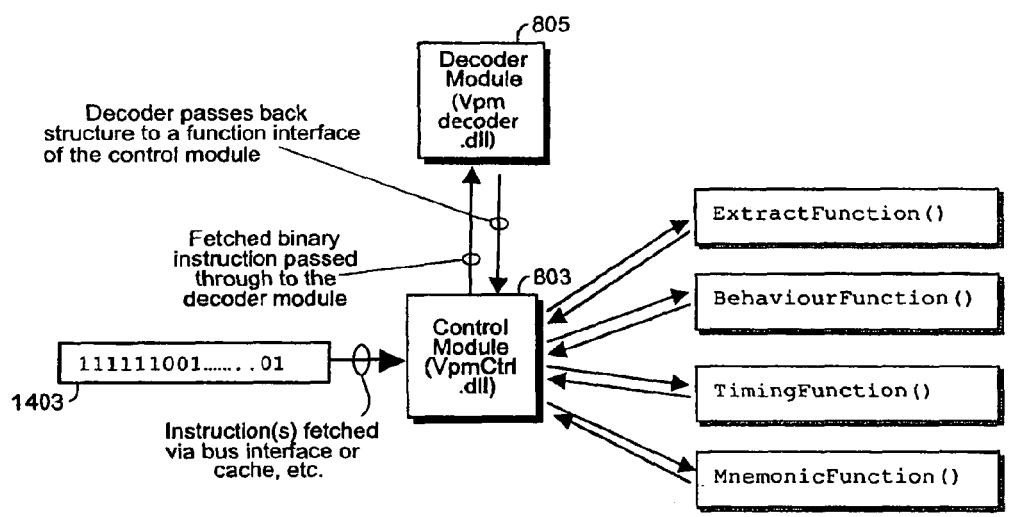
FIG. 14 shows interaction between the control module, the decoder module and the defined extract, behavior, timing, and mnemonic functions for a particular execution of an exemplary instruction in a transformable virtual processor model according to one or more aspects of the present invention.

FIG. 14 shows interaction between the control module 803, the decoder module 805 and the defined extract, behavior, timing, and mnemonic functions for a particular execution of an exemplary instruction. The instruction 1403 is fetched, e.g., via a bus interface or a cache, and so forth. The fetched instruction is passed by the control module 803 to the decoder module 805. The structure of the instruction is passed back to a function interface in the control module 803 so that the appropriate functions can be called by the control module. Note that while the control module and decoder are those of FIG. 8, the functional flow shown in FIG. 14 is identical for seed module operation and for user-defined modules operation.

Thus in one embodiment, for a particular instruction, the VPM decoder module 803 takes the definitions and prototypes of the required functions for a particular instruction and configures the virtual processor model control module to call the appropriate functions when the decoder has decided what the instruction is. The decoder module provides a table of function calls for the control module 803. The user defines the table of function calls for a particular instruction by defining the relevant ISA module, using instruction format definition files that specify instruction bit encodings and relates them to the functions that model the instructions, and the instruction selection rules file that describes which of the instructions specified in the instruction definition format file(s) are to be included in the final instruction set.

The fetched binary instruction 1403 is the actual binary image of that instruction as presented by the target binary code built by the user using the compile chain for the target processor. This fetched binary image is then presented to the decoder in order to establish which of the user-defined functions that this image will be decoded to.

The control module 803 is responsible for creating the binary image of a particular instruction that has been the result of some fetch action. The raw binary image is presented to the decoder and the decoder module 805 passes the names of the functions that are required to execute the instruction to the control module 803. The control module 803 "owns" an instruction prototype file that specifies the existing instruction sets and compatible function prototypes. Therefore in one embodiment, the decoder passes back a structure of functions required to be called, rather than the decoder calling them.

In general, no function call order should be assumed across function calls. That is to say, each function call can be considered an independent call and should reflect the intended functionality. Other than the extract function, which is called first, the order of the function calls is not important.

The extract function for extracting operands is user definable. Although there is no specific sequential function call ordering when the control module calls the instruction functions for behavior, mnemonic and timing for an instruction, the extract function is typically called first in order to extract the relevant operators from the opcodes that will be required by the behavior, mnemonic and timing functions. The extract function, although part of the instruction functions definition, can be independent of the instruction itself. Each instruction typically has an extract function, but indeed many instructions can share the same function if the operators in the opcodes to be extracted are identical. This is achieved in one embodiment by calling common functions from within each of the extract function bodies. The following example shows an example of the interaction between the extract function and the behavior function.

Figure 15:
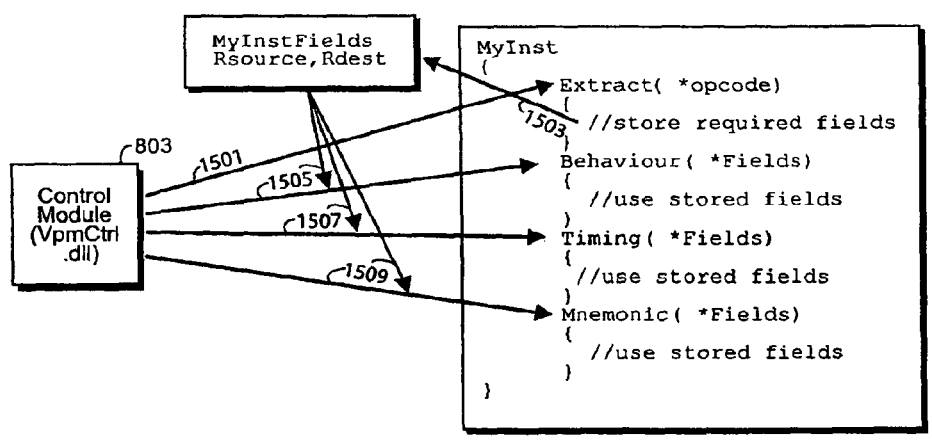
FIG. 15 illustrates the operation of an extract function in a simple example to illustrate one or more aspects of the present invention.

Consider the following instruction opcode:
1111 nnnn mmmm 0010
where nnnn specifies a source register Rsource, and mmmm specifies a destination register denoted Rdest. Any behavior, timing or mnemonic function only needs the Rsource and Rdest to specify its implementation. The extract function's purpose in this example is to provide these fields. FIG. 15 illustrates the operation of the extract function in this simple example. The control module calls the extract function shown as arrow 1501. The extract function stores the required fields for this instruction, shown as arrow 1503. The control module can then call the behavior, timing and mnemonic functions with the required fields, as indicated in FIG. 15 by arrow pairs 1505, 1507, and 1509. It is therefore possible, if multiple instructions have the same extract function implementation, to have common functions be called from within the extract function body.

By using extract functions, the opcode of an instruction can be changed but the fields to be extracted remain the same.

Thus, the behavior/mnemonic/timing function is essentially specified independent of the actual full opcode of the instruction.

The extract function is provided by the user, the user source used to build the user ISA module(s).

Figure 16:
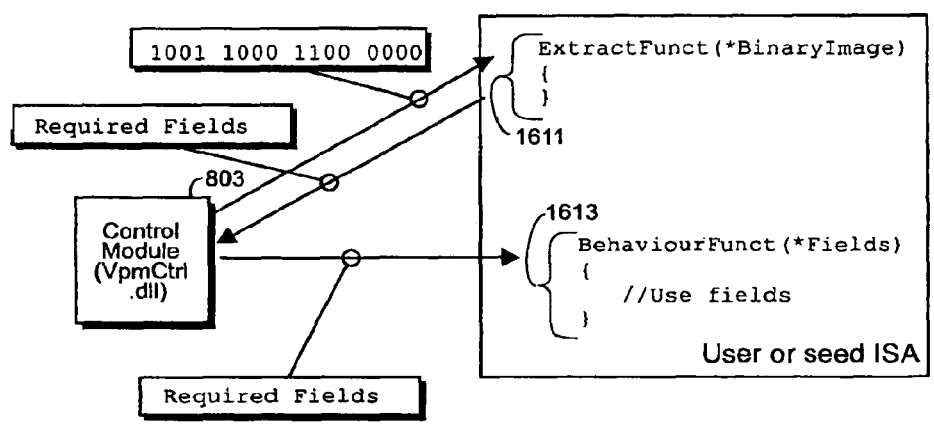
FIG. 16 shows in simple diagrammatic form the interaction of a behavior function defined in the ISA module, with an extract function defined in the ISA module and the control module, using the same example as used in FIG. 15 to illustrate one or more aspects of the present invention.

The behavior function uses the extracted operators from the extract function for the purpose of implementing the behavior. The behavior function, like the extract function is provided by the user, the user source used to build the user ISA module(s). This function forms the generated host code that is executed each time a target instruction is called within the target binary image. FIG. 16 shows in simple diagrammatic form the interaction of the behavior function 1613 defined in the ISA module, with the extract function 1611 defined in the ISA module and the control module 803, using the same example as used in FIG. 15.

Figure 17:
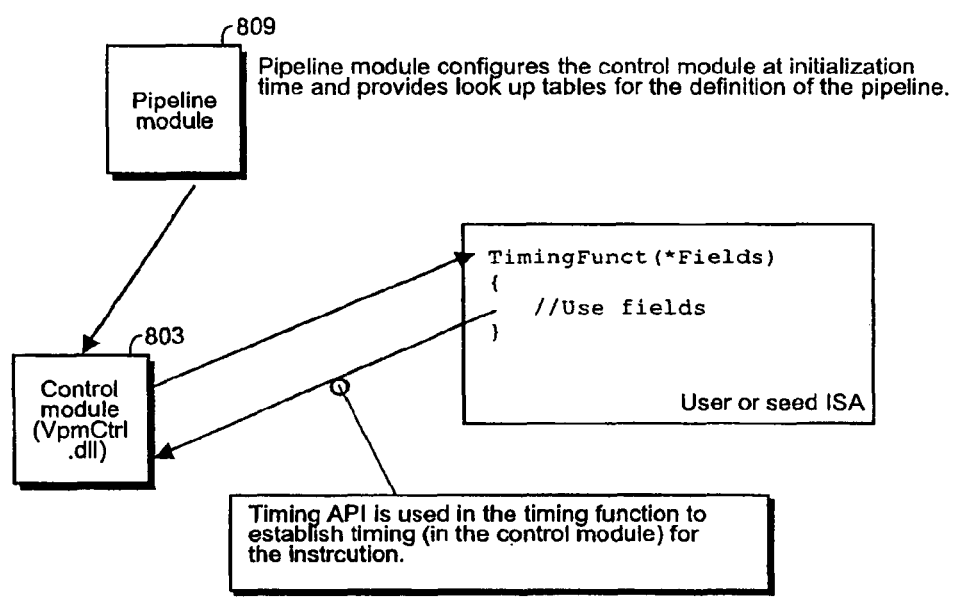
FIG. 17 shows in simple diagrammatic form the interaction of a timing function with a pipeline module that models aspects of the pipeline of the target processor and the control module, using an example to illustrate one or more aspects of the present invention.

The timing function specifies the timing for the instruction. The timing for a particular instruction is typically specified in terms of its interactions with the virtual processor model pipeline module. The pipeline module configures the control module 803 at initialization time and provides look up tables for the definition of the pipeline. The control module 803 calls this function. In one embodiment, a timing application programmers interface (API) is provided and used in defining the timing function; API function calls are used to interact with the control module from within the body of this function. FIG. 17 shows the interaction of the timing function with the pipeline module 809 that models aspects of the pipeline of the target processor and the control module 803.

Figure 18:
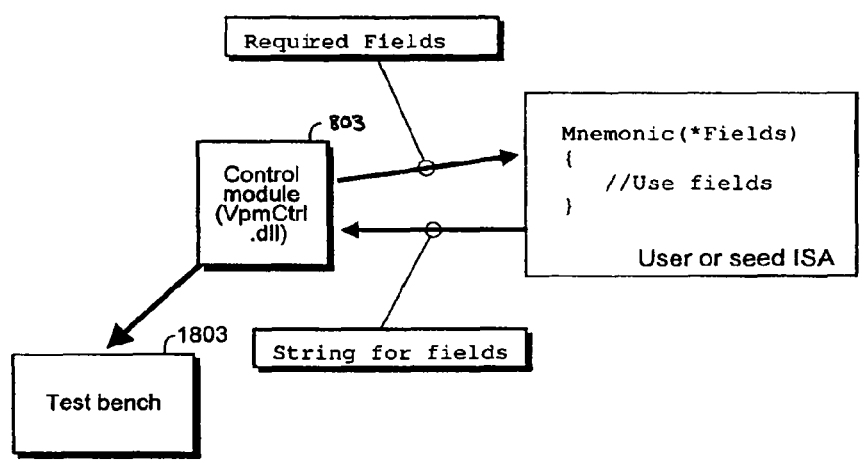
FIG. 18 shows in simple diagrammatic form the interaction with the control module and a mnemonic function and a test bench toolset according to an embodiment of the present invention.

The mnemonic function is a function that does not have an equivalent functionality in a target processor. The control module calls the mnemonic function when a test bench is enabled in order for the instruction operators to be output to a trace file. In one embodiment, defining instructions includes specifying and implementing the mnemonic function. FIG. 18 shows in simple diagrammatic form the interaction with the control module 803 and the mnemonic function and a test bench toolset 1803. In one embodiment, in the case of a register operand, the mnemonic function returns a string to the register number, and not to the actual data contained in that register. The control module establishes the data in the registers that are actually being used here. Note that for a particular instruction, the instruction mnemonic (e.g., MOV, JMP) is already known because this mnemonic function belongs to that particular instruction having the mnemonic.

Design Flow and Methodology

To build a new virtual processor model starting with a provided seed virtual processor model, a user builds a decoder module, e.g., as a .dll, and one or more instruction set architecture (ISA) modules, e.g., as .dlls. The transformable virtual processor model provides a user with the ability to build the decoder module by specifying a set of instructions and the functions that implement those instructions.

In one embodiment, the virtual processor model transformer tool accepts as input:

1) An instruction prototype file, having a name with a ".ipx" extension in one MS Windows implementation. The instruction prototype file specifies the existing instruction sets and compatible function prototypes.

2) One or more instruction definition format files, each having a name with a ".idx" extension in one MS Windows implementation. Each instruction definition format file specifies instruction bit encodings and relates them to the functions that model the instructions.

3) An instruction selection rules file, having a name with a ".isx" extension in one MS Windows implementation. The instruction selection rule file describes which of the instructions specified in the .idx file(s) are to be included in the final instruction set.

One can start with a base set of instructions in the seed virtual processor model .idx file and use one or more additional .idx files to specify instructions to be added, replaced and deleted. Alternatively, one can specify all instructions for a processor.

To add an instruction, in the .idx file a user assigns a unique name and version and specifies the bit encoding for the instruction. The user also specifies the names of the related implementation functions. In one MS Windows implementation, the user provides implementation for the instruction functions in a user instruction set architecture (ISA) .dll.

A user can replace a complete instruction (behavior, timing and mnemonic) or part of an instruction.

Figure 19:
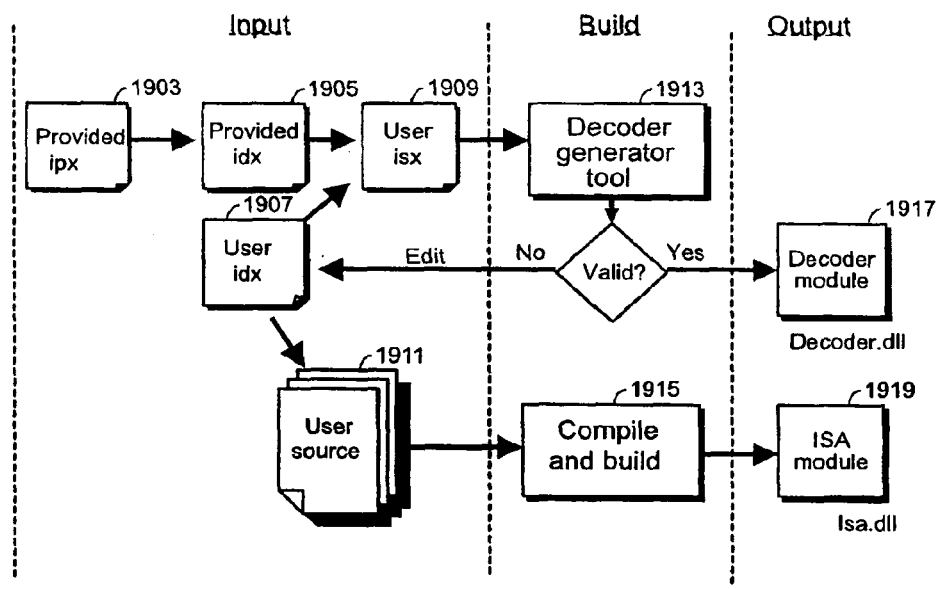
FIG. 19 shows a process and flow of generating the decoder module and ISA modules for one MS Windows embodiment of software that includes one or more aspects of the present invention.

FIG. 19 shows the process and flow of generating the decoder module and ISA modules for one MS Windows implementation. An instruction selection rules file, e.g., .isx file 1909 includes the .ipx file 1903 and .idx files 1905, 1907, and serves as input to a decoder generator tool 1913. This tool 1913 validates the instruction set and generates the decoder. In one embodiment, the decoder generator tool 1913 displays any errors found with details such as the instruction in error and the nature of the error.

A user can then correct any errors by editing the .isx file 1909 or the .idx files 1907. This may involve adding new instructions to fill gaps or modifying existing instructions to remove overlaps. A user, for example, may want to define default functions to fill in the gaps. When the errors have been addressed, one repeats the decoder generator tool step. This cycle continues until there are no errors.

The decoder generator tool generates a decoder module 1917, in the form of a .dll in one MS Windows implementation.

A user supplies ISA modules, e.g., as ISA .dlls 1919 to implement the functions that model new or altered instructions. The ISA .dlls 1919 are built from source data 1911 using standard .dll compiling and building tools 1915.

The user supplied .idx files 1907 provide the reference for the names of instruction implementation functions which form the new ISA .dlls. The ISA .dll and the decoder .dll can be developed in parallel once the user .idx files 1907 are stable.

The inputs are now described in more detail.

The provided instruction prototype file 1903—.ipx file in an MS Windows implementation—specifies the names of the instruction sets that may be implemented and the function prototypes for those instruction sets. This file is not normally edited by the user as it defines the instruction set(s) available to the control module edited by the user. This file contains the behavior, timing, mnemonic, extract and instruction group function prototypes. These prototypes are specific to the seed virtual processor model, and define the prototypes for the user functions that implement modified or new instructions. These names of these prototypes may change on a target processor by target processor basis.

The provided instruction definition file 1905—a provided .idx file in an MS Windows implementation—contains the base instruction set bit encodings in the form of what we call patterns, and the definitions for each instruction in the group defined by the idx file. The file also can contain definitions of the extract masks, used to generate the extract functions. These files are not modified by the user, and required to build the decoder for the fully functional seed, and unless the user is intending to replace the entire instruction set this definition file should be included in any build of the virtual processor model. Even if the user replaces the entire instruction set, this file can still be included, however each instruction in the set would have to be replaced with user variants.

The user-defined instruction definition file 1907—a user-defined .idx file in an MS Windows implementation—contains bit encodings, as what we call patterns, and definitions for each instruction in the group defined by the user. The file also can contain definitions of the extract patterns, used to generate the extract functions for the user fields. There may be one or more user idx files.

This user instruction selection file 1909, an .isx file in one implementation, determines which instructions are selected/omitted in the final instruction set. This final instruction set will define the decoder generated by the decoder Generator utility. The .isx file 1909 effectively builds the definition of the total instruction set as input to the decoder generator tool 1913 and as such there can be only one .isx module per transformable virtual processor model.

The decoder generator tool generates the decoder .dll 1917 from the Instruction Selection Rules (.isx) file. This tool further validates the new instruction set, identifying gaps or overlaps in instruction bit patterns. If errors occur the user must edit the .isx and/or .idx files. The resulting decoder .dll 1917 forms part of the virtual processor model.

When the virtual processor model is executing, the decoder 1917 decodes each instruction and determines the appropriate ISA functions to be called to model the instruction timing, behavior and mnemonic as described above.

The user instruction set architecture (ISA) dlls 1919 forms part of the virtual processor model. These implement the functions required for any parts of the virtual processor model instruction set changed by the user. Such an ISA could be as simple as a single instruction (behavior, timing, mnemonic and extract) or even just one of the functions, or it could represent an entire instruction set that will replace the seed ISA. There can be multiple user ISAs and these ISAs can replace the seed ISA module.

Thus, in one implementation, there are two dependent paths for the creation of an ISA and decoder. Both of these use the same information as a starting point. The idx file is used to define the user modifications to the seed via the creation of the user ISA .dll and by definition if an instruction set has changed then the idx and the rules for decoding (isx) are used to build the new decoder that will reference the instructions in the new ISA.

Figure 20:
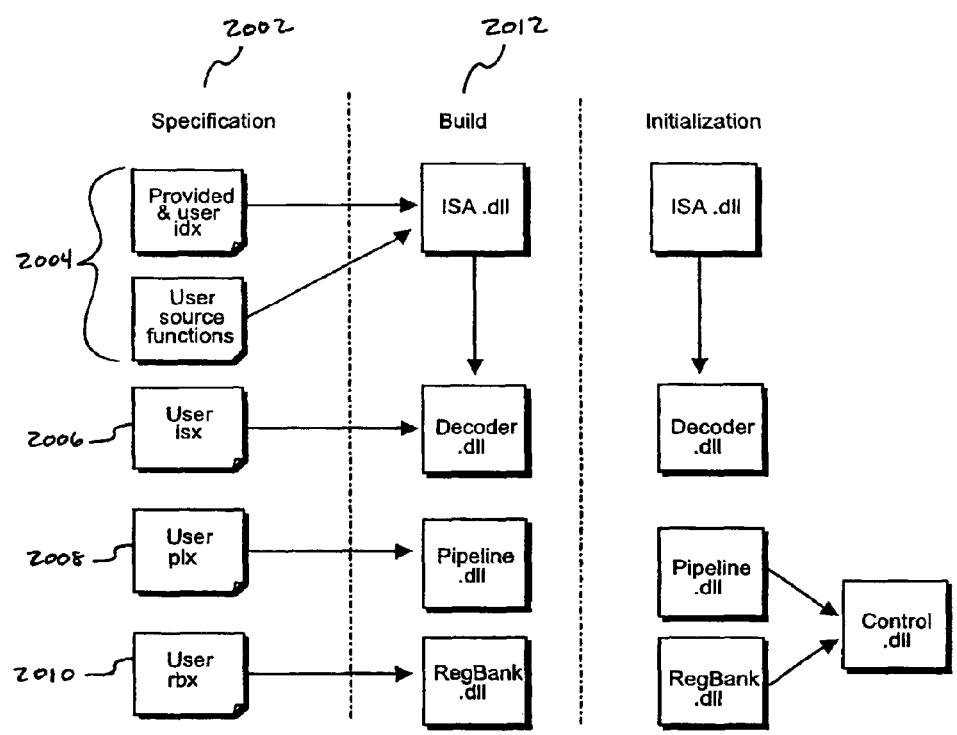
FIG. 20 shows the complete flow of a virtual processor transformer tool embodiment in one MS Windows embodiment of software that includes one or more aspects of the present invention.

FIG. 20 shows the complete flow of the virtual processor transformer tool in one MS Windows embodiment. In this example, there is a transformable virtual processor model—a provided seed to which the user is adding some new instructions. Some of the seed modules have been omitted for clarity. Note also that no ordering of the initialization processes is implied.

Specification includes ISA specification, decoder specification, pipeline .dll specification, and register bank .dll specification.

ISA specification takes the form of both interactions with a provided graphical user interface (GUI) for the simulation system, and the provision of user source code that implements all applicable and necessary C++ functions. The specification can be in addition to any seed provided specification so that existing and modified input can be used in the build. There can be multiple .idx files depending on the design.

Decoder specification takes the form of interaction with the provided simulation system GUI, during which is specified the instruction set information that will be used by the decoder. It does not link ISAs into building the decoder at this stage.

In one embodiment, pipeline specification also takes the form of interaction with the provided simulation system GUI. In another embodiments, the specification includes one or more source files, in the form of plx files in one MS Windows embodiment.

In one embodiment, register bank specification also takes the form of interaction with the provided simulation system GUI. In another embodiment, the specification includes one or more source files, in the form of .rbx files in one MS Windows embodiment.

The .dlls are built by the virtual processor model transformer tool from the specification. Depending on the design required, this can result in one or more .dlls that co-exist with the seed .dlls.

During initialization of the model, prior to simulation start time, the decoder module interrogates the available ISAs and builds a decode data structure, e.g., a decode table that contains, for each instruction, an extract, behavior, timing and mnemonic function. It is this decode data structure that is referenced by the control module when individual instructions are passed and the control module calls the ISA definitions of these functions when required. The pipeline and register bank modules contain no functional code, only initialization code, but do contain reference data structures, e.g., tables for configuring these elements inside the control module. These reference data structures are referenced from the control module when processing functions in the ISAs.

Instruction Patterns and Opcodes.

The starting point for any design project of a transformable virtual processor model is the ISA. The user ISA module(s) (.dll) can co-exist with existing seed ISAs or can entirely replace the seed ISA. Typically, a user will be building one or more ISA module(s) that will co-exist with the seed ISA module. Therefore this is the example that will mostly be shown herein. Those in the art will understand that the principles and are the same if a user wishes to replace a seed ISA.

One aspect of the invention is using instruction pattern for instructions in the ISA description to define the user extract functions to extract the fields required by the behavior, timing and mnemonic functions for each instruction. In instruction patterns, these fields are identified by groupings of characters. The defining of patterns provides for decoding of instructions.

Looking at the specification of a particular target processor, the opcode is usually specified in binary notation or field notation. FIG. 21A shows an ADD instruction from the ARM™ instruction set. Using this example and expanding to its binary form, one embodiment uses a bit pattern convention to represent this instruction as follows:

cccc 0010 100s nnnn dddd oooo oooo oooo where cccc is a condition field, s is CPSR update, nnnn defines the register of the first source operand, one of 16 registers R0 to R15, dddd defines the register of the destination register R0 to R15, oooo defines a shifter operand, and the 1's and 0's are fixed encodings.

In the pattern convention, each unique field uses different characters, and a single character is used for each bit. Remember the purpose of this encoding, is to allow the user extract function to extract the fields required by the behavior, timing and mnemonic functions. It is these fields that can be identified by groupings of characters.

The ARM condition field operates as follows. The first three ccc bits define one of eight conditions: EQ, LT, S, C, . . . , with the last condition, indicated by 111, being always. The last c bit indicates negation, so when this last bit is set, EQ becomes NEQ, LT becomes GE, and so forth, with the always becoming not always. Note that always and not always are mutually exclusive, so that a condition field value 1111 is not useful for the instruction. The ARM instruction set uses a condition field of 1111 for a different instruction.

The following is another example for a fictitious instruction "SHNOD" dest#, Src#, #immed:

SHNOD Rd, Rs, #immed, cond where Rd and Rs are the destination and source register numbers R0 to R15, #immed is an immediate number 0 to 255, and cond is the condition field identical in use to the 4-bit ARM condition field. The pattern is:

cccc 0101 dddd ssss iiii iiii where cccc is a condition field similar to how the ARM condition field operates, dddd defines the register of the destination register R0 to R15, ssss defines the register of the first source operand, one of 16 registers R0 to R15, iiii iiii defines an immediate value of 0 to 255, and the 1's and 0's are fixed encodings.

FIG. 21B shows another example, this one from the Motorola StarCore™ instruction set. The shown instruction ADD #immed, Dn can add a 5 bit immediate number to a D0:7 register. According to one embodiment, the idx pattern encoding for this instruction could be in this case:

0s11 10RR R10i iiii where iiii is a 5 bit immediate field of 32 possible values, RRR is a register number D0:7, s indicates whether or not this instruction is the last instruction in a serial variable-length execution set (VLES) or is in a prefix VLES, and the 1's and 0's are fixed bit encodings.

According to the pattern encoding aspect of the invention, instructions are encoded bit by bit, using a combination of the digits 0 and 1 for bits that must be 0 and 1, respectively, and alphabetical characters for other bits, e.g., the extract function fields. In one embodiment, a symbol is used to indicate an exception pattern, also called an exclude pattern. The bit encoding syntax for patterns is designed to map closely to the typical instruction specification format found in a microprocessor architecture reference manual.

Instructions are written with the most significant bit (msb) at the left. Of course, other conventions may be used in alternate embodiments.

The instruction word size is specified in the provided ipx file for the virtual processor model.

Figure 22:
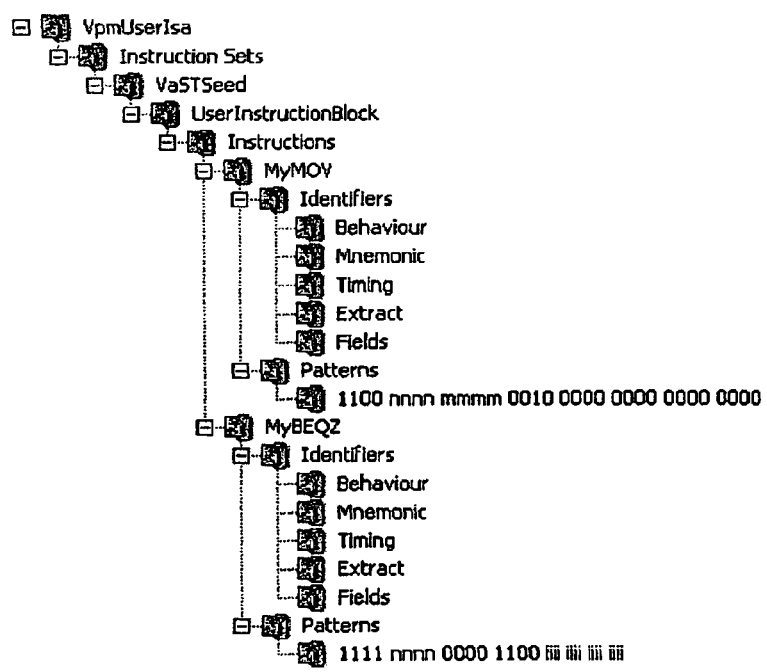
FIG. 22 shows a screen shot of a tree view of an exemplary .idx file that has a two user instructions defined in one MS Windows embodiment of software that includes one or more aspects of the present invention.

The .idx file is editable in a provided GUI and forms the main input specification of the ISA. FIG. 22 shows a screen shot of a tree view of an exemplary .idx file that has a two user instructions defined. FIG. 23 shows Table 1 that describes each of the elements.

One aspect of the invention is a method of specifying patterns that includes an indication of exceptions to patterns, also called excludes. In the first two examples above, the cccc condition field includes a value, 1111, that is meaningless for the instruction, and is not used. Rather than specify an enumeration of all 16 possible values of the cccc condition field, in one embodiment, the pattern is specified as a general pattern, and an exception pattern. A symbol, e.g., a minus sign, is used in one embodiment to indicate an exception pattern. Therefore, for the fictitious SHNOD instruction defined above, the pattern is:

cccc 0101 dddd ssss iiii iiii
−1111 . . . .

The second line indicates an exception.

Another aspect of the invention is the automatic building of a decoder from pattern definitions that include exclude patterns.

Extract Patterns

Another aspect of the invention is describing the extract function for extracting operands from an instruction. In one embodiment, the extract function is implemented by defining a data structure for the operands that are to be extracted, such that during simulation time, for a particular instruction, the extract function extracts the actual codes in the instruction and places in the data structure. For example, consider again the SHNOD instruction above. Forming the extract function includes defining a data structure for Rd, Rs, and #Immed:

| Rd |
| Rs |
| #Immed |
| . |
| . |
| . |

For a particular target program, the extract might generate, for example, for the case that Rd=R13, Rs=R12, #Immed=128, etc., the structure

| R13 |
| R12 |
| 128 |
| . |
| . |
| . | where R12 and R13 are encodings for R13 and R12.

The extract function thus extracts the fields for the control module to pass to the behavior, timing and mnemonic functions. In the simplest case, there is a single extract function per instruction, and hence this extract function is contained within the same namespace as all other user functions.

In one example, the simplest and easiest approach for a user when adding an instruction or replacing an instruction which overrides an existing instruction in the seed virtual processor model is to define the instruction in its entirety.

Thus, to specify an instruction, there is needed to be specified a pattern, the timing function name, the behavior function name, the mnemonic function name, the extract function, the extract fields, the extract data structure, and so forth. Explicitly specifying all these may require a large amount of text. One aspect of the invention provides for the user to create a re-usable namespace for referencing in instructions. Such an aspect provides for declaring an extract function pool in which typical extract functions are defined and are able to be referenced, e.g., by name. Similarly, such an aspect provides for declaring an extract structure pool in which typical extract structures are defined and are able to be referenced, e.g., by name. Thus, an aspect provides for having named entities such as different extract functions, different extract data structures, and so forth. During the build phase, in one embodiment, for a particular instruction that includes a name, e.g., for the extract function and/or the extract structure, the pattern of the instruction is automatically matched to a pattern of the relevant pool, e.g., the extract function pool, and as a result of the match, the extract function name and/or extract structure name is expanded to the extract function and/or extract structure from the pool. This provides for the user the ability to define within pools instruction independent extract functions, extract structures, etc.

In order for the user to individually replace these functions or structures, it is necessary for the tool to know the structure of the fields that will be passed to the individual instructions. This is done by referring to the seed field structures, and also defining a field pool. This field pool can be referenced using macros to associate the extract functions with the fields to be extracted.

Figure 25:
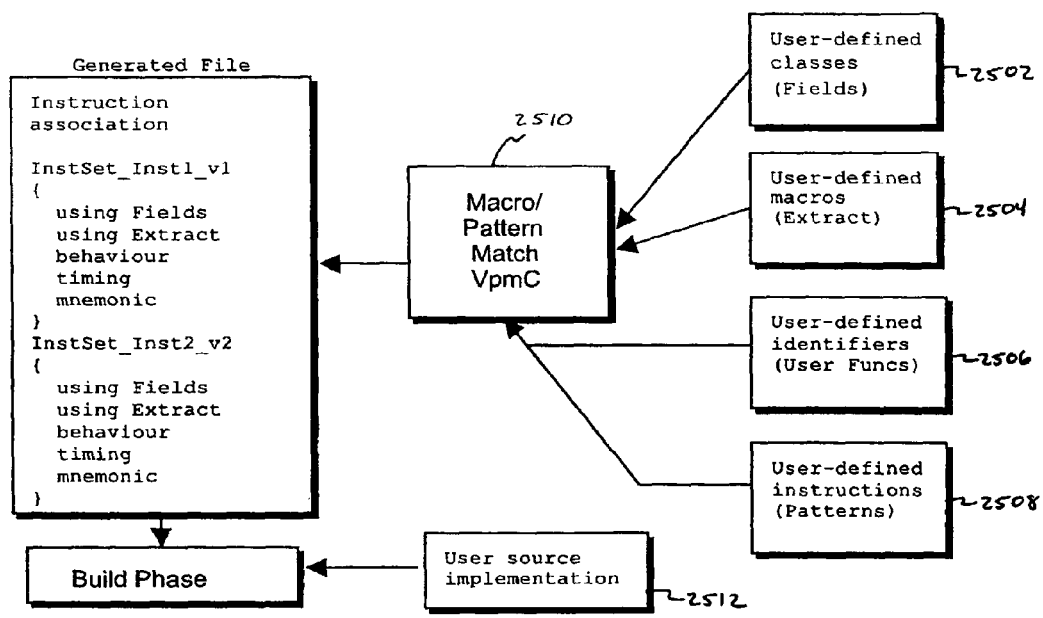
FIG. 25 shows how aspects such as user created fields, user created extract macros, user created identifiers for functions, and user defined instruction patterns can be used with a macro/pattern match tool to provide files for creating or modifying instructions, using an embodiment of the present invention.

FIG. 25 shows how aspects such as user created fields, user created extract macros, user created identifiers for functions, and user defined instruction patterns can be used with a macro/pattern match tool to provide for files for creating or modifying instructions.

The user generates multiple instruction definitions by individually declaring fields, extract patterns and generic names for behavior, mnemonic and timing functions. The virtual processor model transformer tool, using macro replacement, generate functions in a fixed format namespace depending on macro generation rules defined by the user.

The links required by each of the instructions so that exceptions and fields are all assigned appropriately to each instruction implementation are also generated. This, in effect, generates a C++ namespace for each of the instructions to be added, leaving the user to define the body of the instruction implementation, or indeed the body of an individual function replacement within the seed.

Other embodiments include different methodologies of using the facility.

Every extract function has a pattern associated with it in much the same way as an Instruction has an opcode pattern. Consider the following instruction opcode:

1111 nnnn mmmm 0010

A suitable extract pattern for this particular opcode would be the following:

---- nnnn mmmm ---- where ---- is used to mask the rest of the opcode, nnnn is the extract source register store-in structure, and mmmm is the extract destination register store-in structure.

Figure 26:
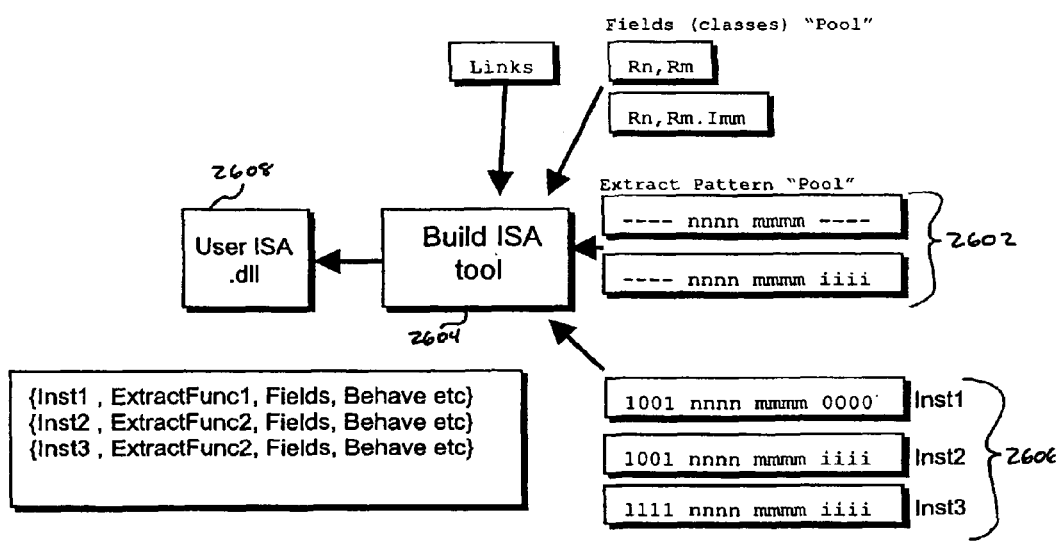
FIG. 26 shows how a pool of extract functions and fields can be declared and also shows how the virtual processor model transformer tool automatically associates the extract function with the instruction by means of pattern matching and macro replacement during the build of an ISA, using an embodiment of the present invention.

FIG. 26 shows how a pool of extract functions and fields can be declared and also shows how the virtual processor model transformer tool automatically associates the extract function with the instruction by means of pattern matching and macro replacement during the build of an ISA. The method pre-processes the .idx file and generates the namespace definitions for the user instructions.

Thus, when specifying instructions, in one embodiment, a user can explicitly specify an aspect such as the extract pattern, e.g., by its predefined name, or, in one embodiment, as an alternate, not specify the pattern, and the virtual processor model transformer tool carries out a pattern match to see if there is a matching extract pattern and pattern name, and substitutes for the found extract pattern and name.

Having extract functions provide, for example, the ability to easily specify different instructions that have the same fields to be extracted. For example two instructions may have different opcodes but the fields to be extracted could be the same. Therefore the behavior/mnemonic/timing functions for these instructions are essentially independent of the actual full opcode of the instruction. A user can declare functional blocks that can be re-used and re-specified in terms of common extract functions and fields. For large amounts of instruction development it can be more convenient in design re-use.

The simplest way to develop an extract function to be associated with an instruction is to have the extract function and fields structure, the "Fields" structure of type sFields contained within the namespace of the instruction itself. This will "lock" the extract function and fields structure (sFields) to this instruction.

Consider the following example of a 32 bit instruction pattern as defined in the .idx file: cccc 0010 100s nnnn dddd 0000 0000 0000, where these fields are as described for the ARM ADD instruction above.

FIG. 24 shows an exemplary extract function for this instruction, where eVpmReg( ) is a provided specific enumerated type that casts the register number to this predefined type. The extract function is passed a pointer to the binary image of the opcode and a pointer to a storage element which will contain the register numbers and miscellaneous information derived from the opcode. These register numbers, along with any other elements in the opcode that wish to be extracted, are stored in a field to which a pointer is passed to the behavior/timing/mnemonic functions. This function returns the size of the field structure (sFields) declared in the .idx file and the corresponding structure declared here.

Defining a Mnemonic Function

The mnemonic function operates on the field structure and passes a string back to the control module to pass to a provided test bench subsystem. Normally there is a single mnemonic function per instruction, and hence this mnemonic function is contained within the same namespace as all other user functions. As with all of these instruction functions it is possible to write common functions that can be called from within the actual mnemonic function. The mnemonic function is explained using a simple example.

Consider the following example of a MOV instruction as documented in a typical specification. This is normally expressed in generic terms as follows.

MOV Rn,Rm where an actual disassembled version of this would show the actual register numbers, e.g., MOV R2,R4. This disassembled Mnemonic is the responsibility of the mnemonic function within an instruction.

FIG. 27 shown an applicable exemplary mnemonic function for this MOV instruction according to an embodiment of the present instruction.

In this example the "MOV" mnemonic is given 2 character spaces before printing the register names. Calls to a provided API are made to the control module to get the register name at the register number as stored in the field structure.

Implementing Behavior by Dynamic Translation

One aspect of the invention is the technique that underlies the fast processor modeling: dynamic translation, also called binary translation, that includes dynamically translating target code into host code. That host code is then cached within host data space of the virtual processor model for rapid reuse. Because target code is executed many times compared to the number of times it is translated, the behavior phase of instruction interpretation time can be repeated many times without any change and re-translated when a change of state occurs.

Figure 28:
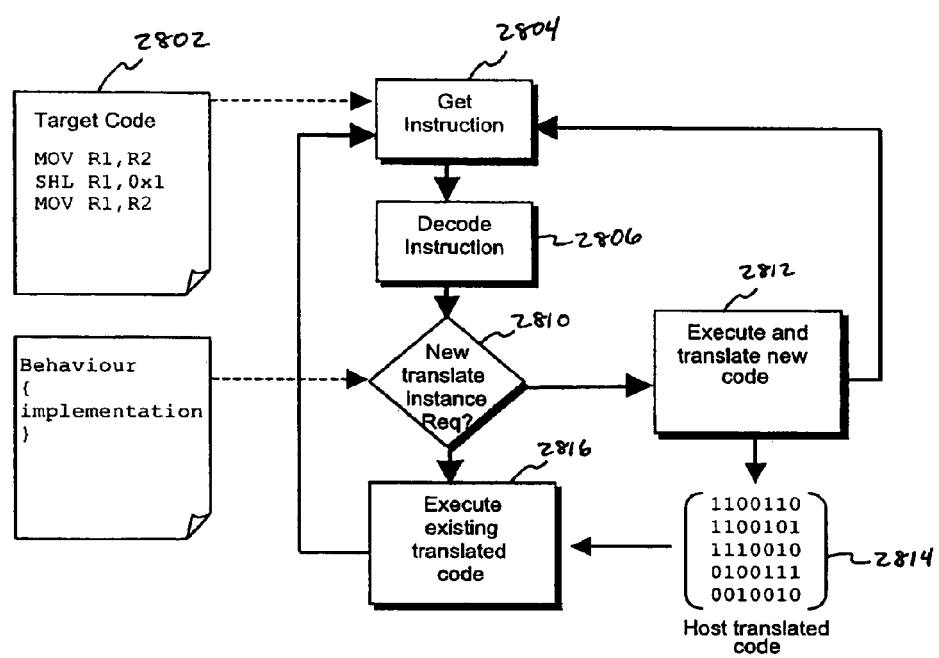
FIG. 28 diagramatically illustrates the operation of a single, instruction that is dynamically translated to Intel x86 code, according to one or more aspects of the present invention.

FIG. 28 diagramatically illustrates the operation of a single instruction that is translated to Intel x86 code, including illustrating what will happen when the example target code image is executed. In this particular simplified example, the target code is executed one instruction at a time and it can be presumed that the first instruction shown is the first instruction since leaving reset. The opcode for the first instruction is fetched and decoded to MOV R1,R2. The behavior implementation for this instruction is then called by the control module. This code is then executed and stored in memory. It can be viewed as a copy of the behavior function implementation. The next instruction SHL R1,Ox1 is processed in exactly the same way. So in fast access memory, there are now two blocks of translated code, one for each of the instructions so far. The next instruction MOV R1,R2 is then decoded, but this time, an already translated block of code is found for this instruction. So this time the translated code is executed directly. It can be seen that as the target code execution progresses, the virtual processor model builds up many translated blocks of code and can execute these in a highly efficient manner from host cache. The virtual processor model can in fact, decide to destroy and re-translate an instruction implementation at any time, if it needs to update its state information. This for example would happen on a change of processor mode within the model.

Translate time and runtime are two distinct phases in the processing and execution of an instruction. Translate time runs the entire behavior function and creates the generated code, e.g., in the host cache. During runtime, only the code that has been generated is executed.

FIG. 29 shows a relatively simple exemplary behavior function that implements a simple register MOV type instruction. As it can be seen, the behavior function is independent of the opcode itself, due to the extract function pre-processing of the sFields Structure.

This behavior function uses provided functions in a control module API, in particular GetReg( ) and PutReg( ).

FIG. 30 shows an exemplary behavior function of an implementation of a simple BEQZ (Branch if Register Equals Zero) instruction using a provided API function for the control module, called JumpFixedOffset( ).

The main purpose of a behavior function is not to execute, but to generate code in the host memory, that will execute the host equivalent of the target binary instruction.

Figure 31:
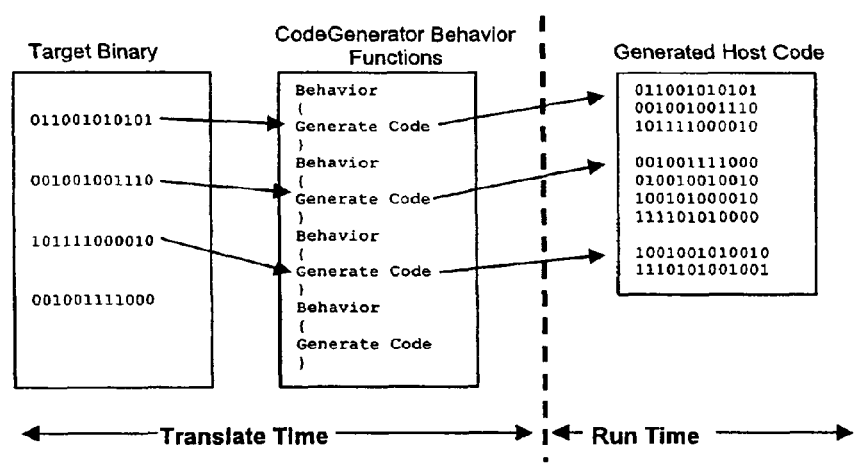
FIG. 31 shows diagrammatically how a behavior function operates at translate time to generate host code that is run at run time, according to one or more aspects of the present invention.

So this function will execute during translate time, and will cause x86 code to be generated into a block of memory that will be executed by the host during runtime. FIG. 31 shows diagramatically how the behavior function operates at translate time to generate host code that is run at run time.

One aspect of the invention is an x86 code generator language and set of API function calls that generate code. In particular, one aspect is a providing set of C++ objects such that the language to define behavior appears similar to the assembly code being translated. For example, when translating ARM code to Intel x68 code, using the provided objects, the definition of the translated code appears similar to the code being translated.

When this language and APIs are used, code is generated that reflects the behavior described. Using this language it is conceptually easier to visualize what code will be generated by the behavior function. Taking each line of this function one by one, the comments can be explicitly expanded to describe what is going on.

pVpmGen->GetReg(rEAX, pFields->Rn); //Store Register

This API call generates code which will store the value in the register Rn in the host register EAX.

xCMP rEAX<<0; //compare if value is '0' in EAX

This API call using a pre-defined object xCMP generates code which will compare the value in the host register EAX with 0.

```
xIF(ccEQ); // Branch if this is the case
    pVpmGen->JumpFixedOffset(pFields->PcOffset);
xENDIF;
```

This construct, which includes an xIF pre-defined object an xENDIF and the JumpFixedOffset( ) API call, generates code which will look at the flags in the host flags register and generate code that will cause the program flow to change to another location.

So it can be easily seen that the C Code controls the code which is generated and the user can relate x86 code generator constructs to exactly what will happen during runtime.

In general, the extract function processes information that is known at translate time. For example, the register number (R0,R1 etc) in a particular instruction or any fixed offset address or immediate value. It is the behavior function that generates code to evaluate the state of the virtual processor model at runtime. Runtime elements include values inside registers and memory locations on the bus. FIG. 32 shows Table 2 that gives an example of a few instructions and highlights the translate time and runtime elements for such examples. From these examples, one in the art will be able to generalize to other instructions Timing and Pipeline Definition Interactions between instructions, where an instruction requires the output of a previous instruction, may result in stalls in the pipeline. The following example demonstrates this.

Consider a typical exemplary RISC pipeline with five stages: Instruction Fetch, Decode, Exec, Memory and Write. Each stage represents 1 tick of a clock.

Consider the instruction:

ADD R0, R1, R2 LSL R3, that is, R0 □R1+(R2<<R3)

Figure 33:
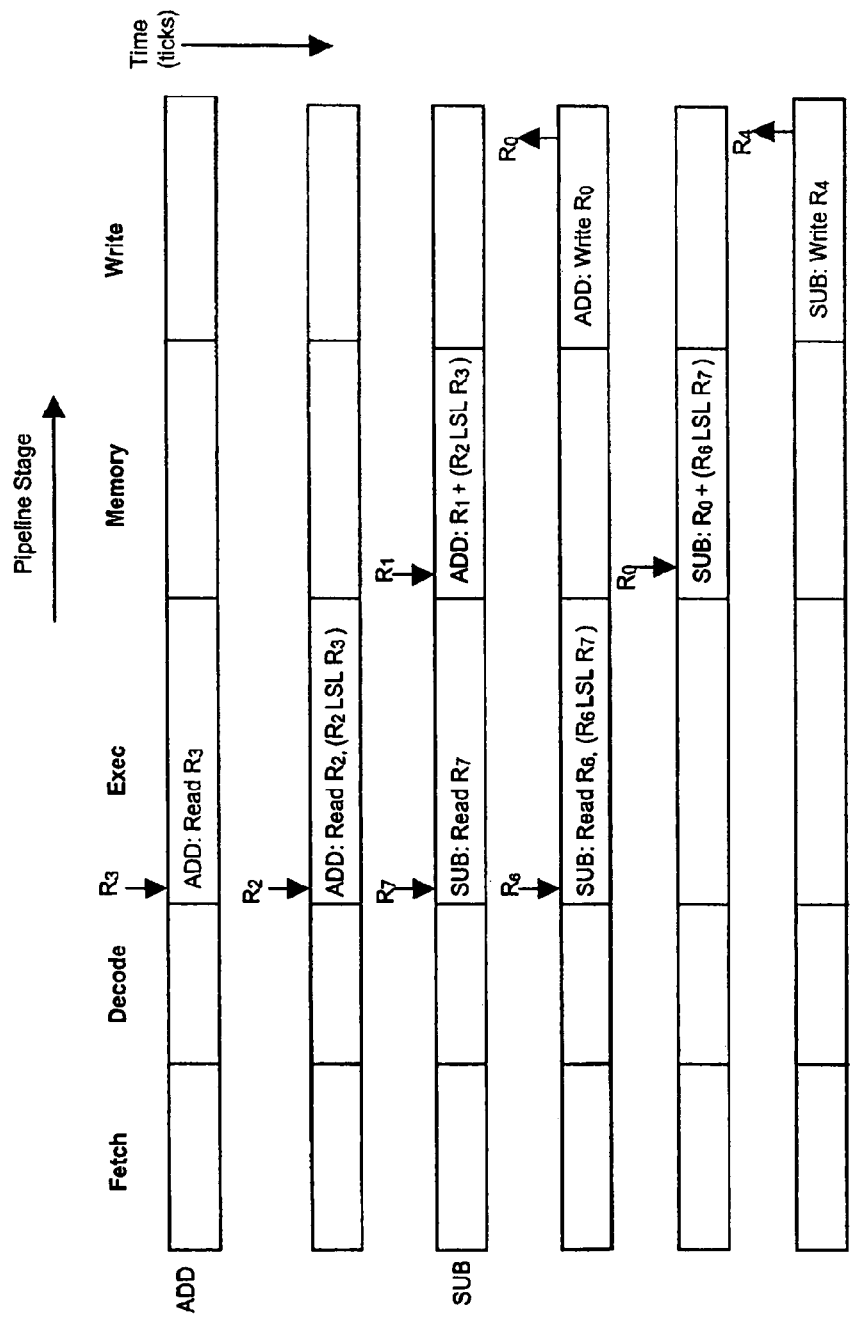
FIG. 33 shows a representation of an exemplary five stage pipeline for a few clock ticks after the Decode stage completes for an exemplary ADD instruction followed by an exemplary SUB instruction in order to illustrate one or more aspects of the present invention.

This instruction requires three registers as input and stores its output in a fourth register. FIG. 33 shows a representation of the five stage pipeline for a few clock ticks after the Decode stage completes for this ADD followed by this SUB instruction. The R0 containing the output of the ADD operation is available at the end of the fourth clock tick after the decode stage completes. Suppose the ADD instruction is followed by:

SUB R4, R0, R6 LSL R7, that is, R4 □R0-(R6<<R7)

Here the SUB instruction requires R0, the output of the ADD instruction. However Exec stage of the SUB does not require R0 until after the ADD instruction has written the output to the register. Consequently the SUB instruction can begin executing without waiting for the ADD instruction to complete. This is illustrated in FIG. 33.

Suppose on the other hand, the ADD instruction is followed by:

SUB R4, R5, R6 LSL R0 that is, R4 □R5-R6<<R0)

Figure 34:
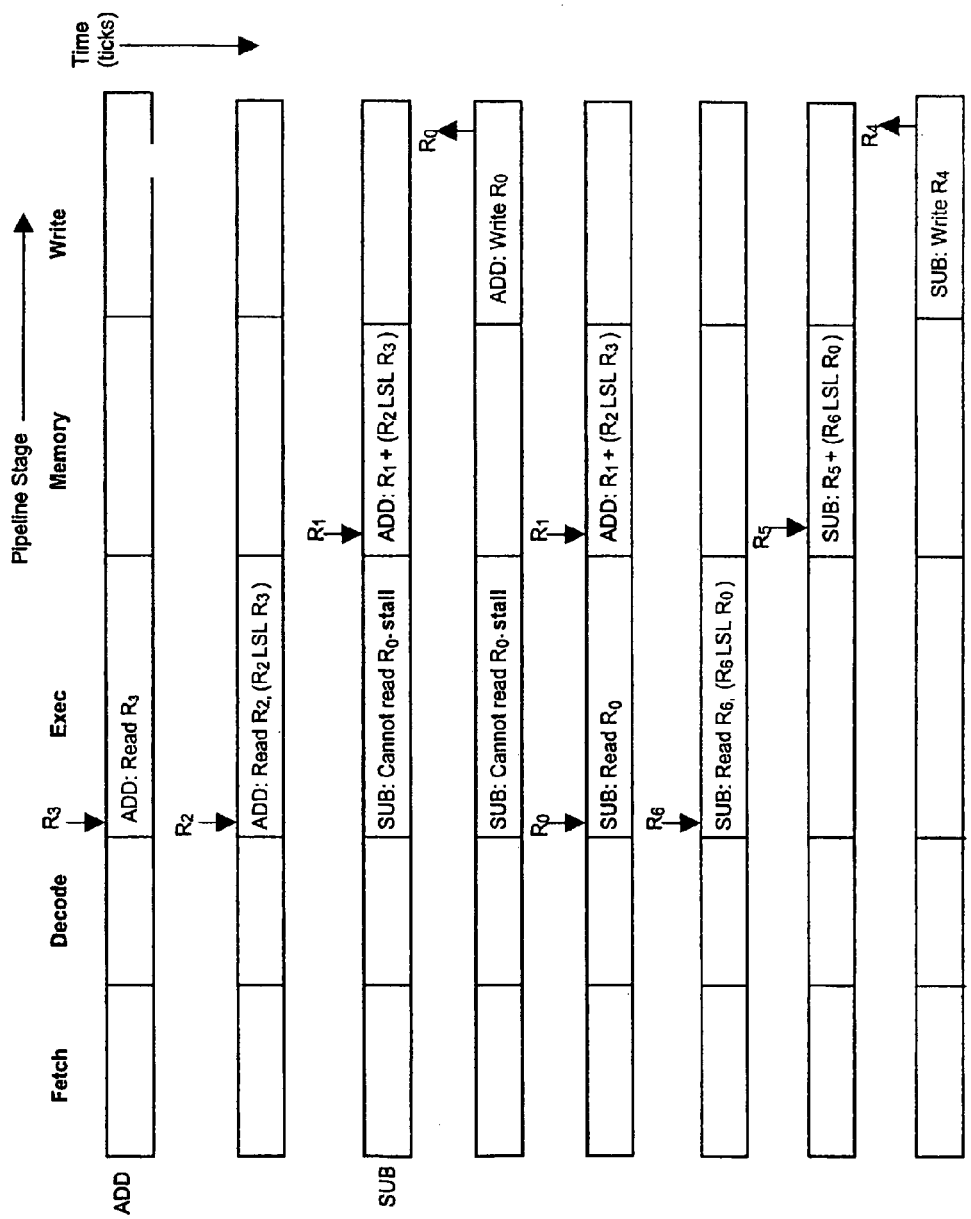
FIG. 34 shows a representation of an exemplary five stage pipeline for a few clock ticks after the Decode stage completes for an exemplary ADD instruction followed by a different exemplary SUB instruction in order to illustrate one or more aspects of the present invention.

FIG. 34 shows a representation of the five stage pipeline for a few clock ticks after the Decode stage completes for this ADD followed by this slightly different SUB instruction. Here the Exec stage of the SUB instruction does requires the contents of R0, the output of the ADD instruction, before it can proceed. However the ADD instruction does not complete until two ticks after the SUB instruction arrives at the Exec stage. This results in a stall for two ticks while the SUB instruction waits for R0 to become available. This, two single-tick stalls will need to be inserted so that the contents of R0 are available in time for the SUB.

Figure 35:
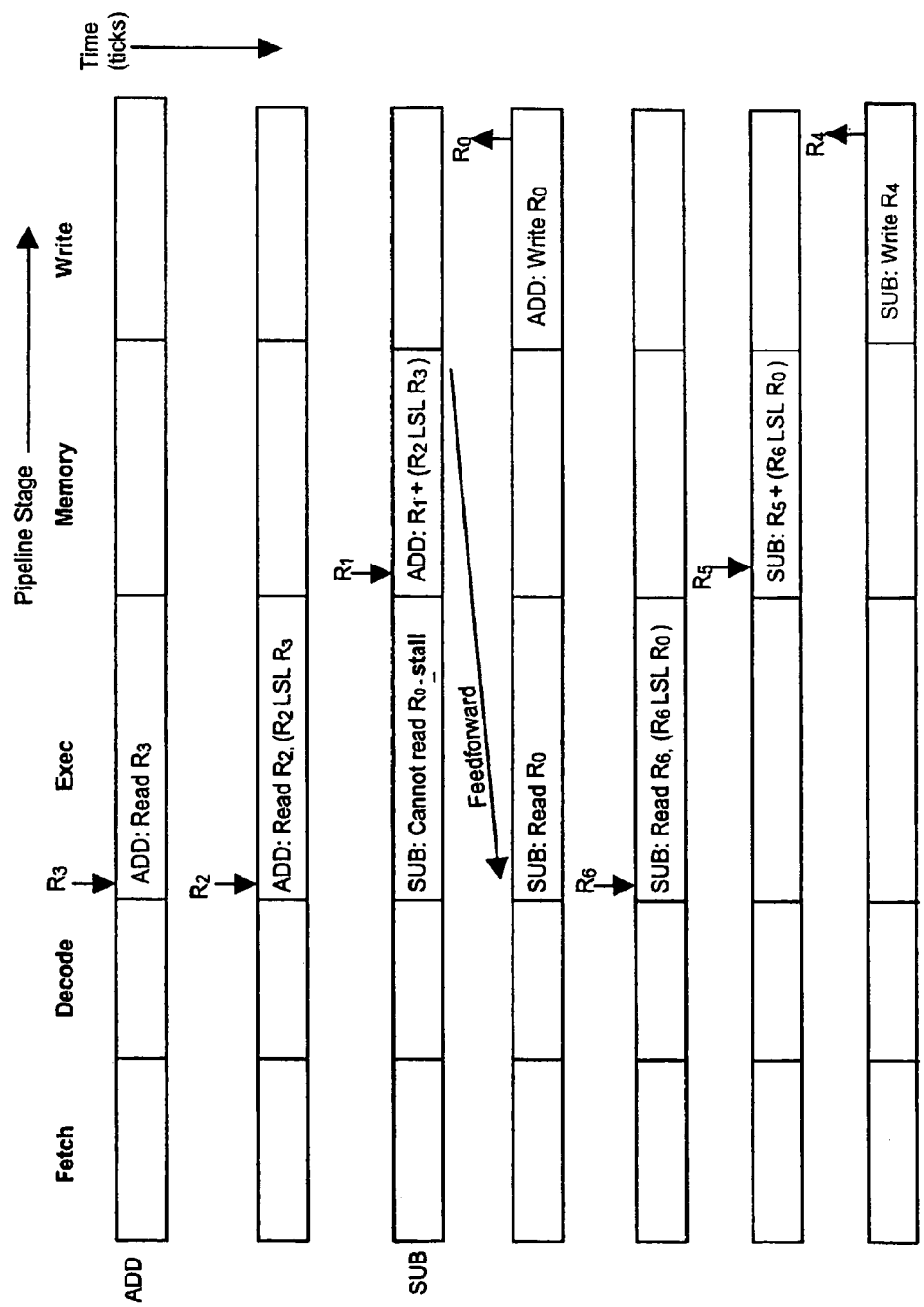
FIG. 35 shows a representation of an exemplary five stage pipeline for a few clock ticks after the Decode stage completes for the exemplary ADD and SUB instructions of FIG. 34, but for the case of feedforwards being implemented, in order to illustrate one or more aspects of the present invention.

Some processors allow feed-forward, also called bypass. For example, in the above situation of the SUB needing R0, note that while R0 is not yet written, the data to be written into R0 is available before R0 is available. By implementing feed-forward, the results of the Exec or memory, if available, are made available to other parts of the pipeline. FIG. 35 shows a representation of the five stage pipeline for a few clock ticks after the Decode stage completes for the same ADD followed by the SUB instruction as the case for FIG. 34, but for a processor that implements a bypass, or feed-forward, between the Memory and Exec stages of the pipeline, making R0 available to the Exec stage before the ADD instruction reaches the Write stage. In this case, the result of the ADD instruction is available one tick earlier, reducing the stall to one tick.

One aspect of the invention is the ability to specify both stalls and feedforwards for the pipeline so that the timing function can provide accurate timing.

To characterize the relationship between instructions, one aspect provides for specifying what registers are required by an instruction at what stage of the pipeline. In one embodiment, the provided API for the transformable virtual processor, there are function calls available to accomplish this. In the timing function for the above ADD R0, R1, R2 LSL R3 instruction, for example, the register requirements might be characterized as:

```
/* get register R3 in eExec stage on first tick of instruction
*/
    VpmPipelineGet(R3, e1st, eExec);
    /* get register R2 in eExec stage on second tick of instruction
*/
    VpmPipelineGet(R3, e2nd, eExec);
    /* get register R1 in eMem stage on third tick of instruction
*/
    VpmPipelineGet(R1, e3rd, eMem);
    /* store in register R0 in eWrite stage on last tick of
instruction */
    VpmPipelineRegLoad(R0, eLast, eWrite);
```

To characterize feeds-forwards (bypasses) and other delays, one embodiment of the VPM Transformer tool uses a data structure that characterizes the relationship between when each source is needed at each stage of the pipeline and when each destination register is available in each stage of the pipeline. In one embodiment, the data structure is an array, called the pipeline delays array herein. This is a table, with a column for each pipeline stage of an instruction writing a register (a destination), thus providing an indication of when a register is available, and a row for each pipeline stage of an instruction reading a register (a source), indicating when a register is needed. The value at a particular column and row determines the delay between one instruction writing a register at a specified stage and a subsequent instruction being able to read the register at another stage (no feedforwards). With feedforwards, the value at a particular column and row determines the delay between one instruction making data destined for a register available at a specified stage and a subsequent instruction being able to read the data destined for a register at another stage.

In one embodiment, the delay is represented as a bit pattern that represents the number of stages, where the bit position represents the number of ticks, starting with the least significant bit, and a 1 represents not available, and a 0 represents available.

In the Bypass example above, the bit pattern at writing instruction Memory stage column and the reading instruction Exec stage row would be 0 . . . 01, a one tick delay. In one embodiment, this vector is encoded as 0x1.

Consider as an example the following sequence of instructions:

ADD $R_3, R_2, R_1$, i.e., $R_3 \Leftarrow R_2+R_1$
MULT $R_4, R_5, R_3$, i.e., $R_4 \Leftarrow R_5 \times R_3$
ADD $R_6, R_4, R_7$, i.e., $R_6 \Leftarrow R_4+R_7$ and consider again the 5-stage pipeline Fetch, Decode, Exec, Memory and Write, with each stage represents 1 tick of a clock.

The first ADD instruction needs R1 at (start of) Exec, R2 at (start of) Memory and makes the results for R3 available at (end of) Memory. The MULT instruction needs R3 at (start of) Exec, R5 at (start of) Memory and makes the results for R4 available at (end of) Memory. The second ADD instruction needs R4 at (start of) Exec, R7 at (start of) Memory and makes the results for R6 available at (end of) Memory.

A pipeline delays array would then be as follows:

|  |  | Destination (when avail) | | |
|---|---|---|---|---|
|  |  | Exec | Memory | Write |
| Source (when needed) | Exec |  | 1 | 2 |
|  | Memory |  |  | 2 | 3 |
|  | Write |  |  |  |

When the number of ticks that are between when a destination is available by an instruction, and when a source is needed by a subsequent instruction is expresses as a bit pattern—a binary-valued vector, the, for example, the delay between when the Memory stage makes a result available and when the Memory stage needs an instruction is 2 ticks, that can be expressed as:

...0 0 0 1 1

In one embodiment, this is expressed in the delays specification as a hexadecimal number, i.e., Ox3.

The least significant bit is 1, indicating that the result is not available at the start, the next bit is also 1 indicating that the result is still not available after 1 tick, then the next bit is 0 indicating that the result is available after 2 ticks. The next bit also is 0 indicating that the result is available after 3 ticks, the next bit also is 0 indicating that the result is available after 4 ticks, and so forth.

More complex architectures may have a pipeline with more stages. For example, suppose a processor has a seven stage pipeline that has stages as follows: Fetch, Decode, four execution stages denoted Exec1, Exec2, Exec3, and Exec4, and a Write stage. For simple instructions, the two additional execution stages Exec3 and Exec4 would not do anything other than pass onto the next stage. Therefore, an instruction such as:

ADD $R_3, R_2, R_1$, i.e., $R_3 \Leftarrow R_2+R_1$ would need R1 at (start of) Exec1, R2 at (start of) Exec2, makes the results for R3 available at (end of) Exec2, and then have no result available at Exec3, none available at Exec4, and then have the contents written into R3 at the Write stage, with the contents available at the end of Write.

Consider the entry for a source at Exec 1. The vector would be:

...0 0 1 1 0 1 1 to indicate that the result is available after two ticks, but not after three, not after 4, and is again available after 5 or more ticks. In one embodiment, this expressed in the pipeline specification as a hexadecimal number, i.e., Ox1b.

The same pipeline stage may have different name/usage for different instructions. For these, more rows and columns are added to the pipeline delays array using these different names. In one embodiment, an indication is included to indicate the ordering of the stage names in the physical pipeline being modeled. In one version, the ordering is provided in a separate table. In another, the pipeline delays array contains the information as additional rows and columns related to the title rows and columns.

As a fictitious example, consider a pipeline that includes Fetch, Decode, Exec, Memory, and Write stages. Suppose for an ADD instruction, the Exec stage is called Exec1A, and for a MULT instruction, the Exec stage is called Exec1M. Furthermore, suppose that for an ADD instruction, the Memory stage is called Exec2A, and for a MULT instruction, the Memory stage is called Exec2M. Then the pipeline delays array would have the following rows and columns:

|  |  | Destination (when avail) | | | | |
|---|---|---|---|---|---|---|
|  |  | $Exec1_A$ | $Exec2_A$ | Write | $Exec1_M$ | $Exec2_M$ |
| Source (when needed) | $Exec1_A$ |  |  |  |  |  |
|  | $Exec2_A$ |  |  |  |  |  |
|  | Write |  |  |  |  |  |
|  | $Exec1_M$ |  |  |  |  |  |
|  | $Exec2_M$ |  |  |  |  |  |

To indicate that Exec1A and Exec1M both correspond to the Exec stage that immediately follows Decode, and that Exec2A and Exec2M both correspond to the Memory stage that immediately follows Exec, one embodiment includes a structure, e.g., a table that specifies the stage number of each named stage, with stage 0 being the first of the execution stages of the pipeline, i.e., the first stage after the Decode stage. Therefore, a table is provided that includes the following information:

|  | Execution Stage number |
|---|---|
| Exec | 0 |
| Memory | 1 |
| Write | 2 |
| $Exec1_A$ | 0 |
| $Exec2_A$ | 1 |
| $Exec1_M$ | 0 |
| $Exec2_M$ | 1 |

Another aspect of the invention includes in the pipeline delays array illegal/impossible combinations, e.g., entries that would indicate moving backwards in time, such as results are needed before they are available.

Figure 36:
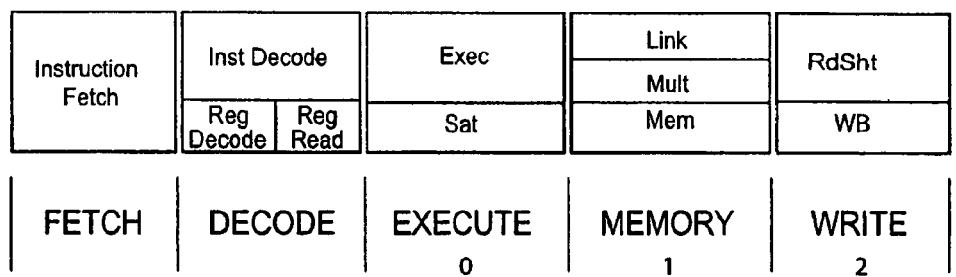
FIG. 36 shows a representation of an exemplary fictitious pipeline, showing where stages called Exec, Mem, WB, Mult, Sat, RdSht and Link stages are in relation to the Exec, Memory, and Write execution stages of a typical five stage pipeline.

FIG. 36 shows a representation of an exemplary fictitious pipeline, similar, to an ARM926E with pipeline stage names Exec, Mem, WB, Mult, Sat, RdSht and Link, showing where these Exec, Mem, WB, Mult, Sat, RdSht and Link stages are in relation to the Exec, Memory, and Write execution stages of a typical five stage pipeline. FIG. 37 shows an exemplary pipeline delay table for the pipeline shown in FIG. 36. In addition to the pipeline delay table, there is provided a table of correspondence for the stages as follows:

|  | Execution Stage number |
|---|---|
| Exec | 0 |
| Mem | 1 |
| WB | 2 |
| Mult | 1 |
| Sat | 0 |
| RdSht | 2 |
| Link | 1 |

The pipeline delays table determines the minimum number of ticks between the start of two instructions, where the second instruction requires the output of the first. When running, the virtual processor modeling method includes examines the bit pattern in the column corresponding to the first instruction, and the row corresponding to the second instruction. The method starts at the least significant bit position, that is, counting from the right, representing the stage the second instruction has reached in the pipeline. It counts bits positions to the left until it reaches a zero. This gives the minimum number of ticks between the start of the first instruction and the second. For example, a bit pattern of 0x7, that is 0111, indicates a three tick delay.

As shown in FIG. 37, the XXX pattern expands to 1 1 . . . 1 1, indicates an instruction dependency that cannot occur.

In addition, a pipeline definition data structure is used to define the pipeline. In one embodiment, this is an array called the pipeline definition array (PipelineDefn), and contains a set of key-value pairs, specifying parameters of the pipeline. FIG. 38 shows an example of a pipeline definition array for an exemplary pipeline.

The instruction timing uses the pipeline definition by using an instruction timing function that calls provided functions that are part of a provided API with details of the pipeline stage at which register accesses take place. For example, a function VprnPipelineRegGet is provided to get a register, and another function, VpmPipelineRegLoad is provided to load a register. Consider, for example the following exemplary code from an exemplary timing function:

```
/* get stack pointer in eExec stage on first tick of */
/* instruction */
VpmPipelineRegGet(eSP, e1st, eExec);
/* store in destination register in eMemory stage on the */
/* last tick of the instruction */
VpmPipelineRegLoad(Rd, eLast, eMemory);
return;
```

By applying the instruction timing function details and the pipeline details specified in the PipelineDelays and PipelineDefn arrays, the virtual processor model determines the simulation time to be allocated to each instruction in the target code.

One apparatus embodiment of the invention includes a host processing system including one or more processors, a memory subsystem, and a storage subsystem. The memory and/or host subsystem includes software for implementing one or more of the simulation methods described herein, including code for describing the transformable virtual processor model, and software—the VPM transformer tool—for transforming a provided, e.g., seed virtual processor model to a user defined model.

Thus has been described a method of transforming a provided virtual processor model to a user virtual processor model. Also described herein is a tool, e.g., as instructions for operating in a host computer system for converting a provided virtual processor model to a user virtual processor model. Also presented here is a method of specifying one or more characteristics of a target processor to transform a provided virtual processor model to a user virtual processor model that when operating in a c-simulation system, simulates the operation of the target processor. For example, presented here is a method of specifying one or more characteristics of instructions to transform a provided virtual processor model to a user virtual processor model.

It should be appreciated that although the invention has been described in the context of software operating in an MS Windows environment, and further, for operating on a host computer system that includes a processor that has an instruction set that includes instructions substantially conforming to the Intel x86 instruction set, the invention is not restricted to such a context, or such an operating system or such a host processor. For example, many of the modules described herein are in the form of .dlls. Other embodiments may use different constructs.

Furthermore, some of the description presented herein is in the form of a language that is like C/C++. Of course the invention is not restricted to what language or constructs are used to provide data or programs, e.g., by the user.

Furthermore, in some cases, an API is mentioned, and several function names used in such API. Alternate embodiments include alternate forms for carrying out this functionality other than function calls. Furthermore, even when functions are used, the particular function names and/or formats are not meant to be limiting, but rather illustrative of one exemplary embodiment.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by a processing system, e.g., the host processing system that includes one or more processors that accept computer-readable (also called machine-readable) code containing a set of instructions that when executed by one or more of the processors carries out at least one of the methods described herein. Any processor capable of executing a set of instructions (sequential or otherwise) that specify actions to be taken are included. Thus, one example is a typical computer processing system that includes one or more processors. Each processor may include one or more of a CPU, a graphics processing unit, and/or a programmable DSP unit. The processing system further includes a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD)

or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a host processing system on which a system that includes one or more target processors is simulated. An apparatus embodiment of the invention includes such a processing system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed, implement a method, a carrier wave bearing a propagated signal detectable by at least one processor of the one or more processors and representing the set of instructions, a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method of transforming a transformable virtual processor model to a user virtual processor model to simulate a user target processor, the method comprising:

receiving a transformable virtual processor model, the transformable virtual processor model configured to perform, on a host processor system, a behavior and timing accurate simulation of a seed target processor, the transformable virtual processor model having a transformable instruction set and a transformable pipeline;

receiving one or more user-provided descriptions of the user target processor, wherein the one or more user-provided descriptions includes a description of a new instruction, including a description of an opcode pattern for a decoder part of the user virtual processor model to select the new instruction, a description of behavior for a functionality of the new instruction, and a description of timing of the new instruction; and transforming the received transformable virtual processor model to the user virtual processor model, wherein the user virtual processor model is configured to perform, on the host processor system, a behavior and timing accurate simulation of the user target processor according to the user-provided descriptions by performing at least one of:

adding the new instruction associated with the user virtual processor model to the transformable instruction set;

modifying a definition of one or more instructions in the transformable instruction set according to the user virtual processor model; and modifying a processor structure of the transformable virtual processor model by performing at least one of:

adding an additional pipeline associated with the user virtual processor model to the transformable virtual processor model; and modifying the transformable pipeline of the transformable virtual processor model according to the user virtual processor model;

wherein the user target processor is to be simulated using binary translation of target code associated with the user virtual processor model into host code associated with the host processor system, including caching translated target code for re-use during simulation of the user target processor, and wherein at least one of the receiving, and transforming is performed by a processor.

2. A method as recited in claim 1, wherein the behavior of the new instruction is provided for dynamically translating the target code with the new instruction into the host code for execution during the simulation of the user target processor.

3. A method as recited in claim 1, wherein the timing of the new instruction is independent of the behavior of the new instruction.

4. A method as recited in claim 1, wherein the timing of the new instruction is used to determine the number of clock ticks that the new instruction takes to execute when the user target processor executes the new instruction as part of the target code executing on the user target processor.

5. A method as recited in claim 1, wherein the user target processor includes a user target pipeline, wherein the one or more user-provided descriptions includes a description of the user target pipeline, and wherein the timing of the new instruction is determined in relation to the description of the user target pipeline.

6. A method as recited in claim 5, wherein the description of the user target pipeline includes one or more of a number of execution stages, and delays between when one instruction needs register information, and when an earlier instruction makes the register information available.

7. A method as recited in claim 6, wherein the delays between when one instruction needs register information, and when an earlier instruction makes the register information available, are provided as a vector that describes when a result is available and when the result is unavailable.

8. A method as recited in claim 6, wherein the transformable virtual processor model includes a description of the transformable pipeline, and wherein a user has an option of redefining the transformable pipeline to describe the user target pipeline, or of keeping the transformable pipeline and adding a description of the additional pipeline as the user target pipeline.

9. A method as recited in claim 1, wherein the description of the new instruction includes a mnemonic function describing a disassembly of the new instruction for tracing the new instruction.

10. A method as recited in claim 1, further including providing one or more patterns to describe decoding of the new instruction.

11. A method as recited in claim 10, further including providing one or more patterns to indicate one or more exception patterns that describe exceptions to patterns.

12. A method as recited in claim 11, further comprising:
building a decoder from the one or more patterns that include the one or more exception patterns.

13. A method as recited in claim 10, wherein the one or more patterns describe one or more fields of the new instruction including extract fields to be extracted for one or more of determining timing and determining behavior when the new instruction is being executed.

14. A method as recited in claim 13, wherein the one or more patterns is provided using a combination of a first and a second symbol for hits being 0 and 1, respectively, and symbols for other fields, including the extract fields.

15. A method as recited in claim 13, wherein the description of the behavior of the new instruction includes a description of a behavior function, and wherein the description of the timing of the new instruction includes a timing function.

16. A method as recited in claim 15, wherein the one or more patterns describe how fields are extracted to form an extract function for the new instruction.

17. A method as recited in claim 16, wherein when the new instruction is simulated, the extract fields are passed in an extract structure to one or more of the behavior functions and the timing function.

18. The method as claimed in claim 1, wherein the transforming the accepted transformable virtual processor model to the user virtual processor model includes at least one of:

adding a new register to a transformable register bank of the transformable virtual processor model; and
modifying the transformable register bank of the transformable virtual processor model.

19. A method of transforming a transformable virtual processor model to a user virtual processor model to simulate a user target processor, the method comprising:

receiving a transformable virtual processor model, the transformable virtual processor model configured to perform, on a host processor system, a behavior and timing accurate simulation of a seed target processor, the transformable virtual processor model having a transformable instruction set and a transformable pipeline;

receiving one or more user-provided descriptions of the user target processor; and transforming the received transformable virtual processor model to the user virtual processor model, wherein the user virtual processor model is configured to perform, on the host processor system, a behavior and timing accurate simulation of the user target processor according to the user-provided descriptions by performing at least one of:

adding a new instruction associated with the user virtual processor model to the transformable instruction set;

modifying a definition of one or more instructions in the transformable instruction set according to the user virtual processor model; and modifying a processor structure of the transformable virtual processor model by performing at least one of:

adding an additional pipeline associated with the user virtual processor model to the transformable virtual processor model; and modifying the transformable pipeline of the transformable virtual processor model according to the user virtual processor model, wherein the user target processor is to be simulated using binary translation of target code associated with the user virtual processor model into host code associated with the host processor system, including caching translated target code for re-use during simulation of the user target processor, wherein the transformable virtual processor model includes a set of modules including a transformable control module, a transformable instruction set architecture module, and a transformable decode module, and wherein the transforming includes transforming the transformable instruction set architecture module into a user set of one or more instruction set architecture modules, and wherein at least one of the receiving, and transforming is performed by a processor.

20. A method as recited in claim 19, wherein the one or more user-provided descriptions includes a description of a new instruction, including a description of an opcode pattern for a decoder part of the user virtual processor model to select the new instruction, a description of behavior for a functionality of the new instruction, and a description of timing of the new instruction.

21. A method as recited in claim 19, wherein behavior of the new instruction is provided for dynamically translating the target code with the new instruction into the host code for execution during the simulation of the user target processor.

22. A method as recited in claim 19, wherein timing of the new instruction is independent of behavior of the new instruction.

23. A method as recited in claim 19, wherein timing of the new instruction is used to determine the number of clock ticks that the new instruction takes to execute when the user target processor executes the new instruction as part of the target code executing on the user target processor.

24. A method as recited in claim 19, wherein the user target processor includes a user target pipeline, wherein the one or more user-provided descriptions includes a description of the user target pipeline, and wherein timing of the new instruction is determined in relation to the description of the user target pipeline.

25. A method as recited in claim 19, wherein the description of the new instruction includes a mnemonic function describing a disassembly of the new instruction for tracing the new instruction.

26. A method as recited in claim 19, further including providing one or more patterns to describe decoding of the new instruction.

27. A non-transitory computer-readable storage medium storing a set of instructions that when executed by one or more processors cause the one or more processors to:
   receive a transformable virtual processor model, the transformable virtual processor model configured to perform, on a host processor system, a behavior and timing accurate simulation of a seed target processor, the transformable virtual processor model having a transformable instruction set;
   receive one or more user-provided descriptions of the user target processor, wherein the one or more user-provided descriptions includes a description of a new instruction, including a description of an opcode pattern for a decoder part of the user virtual processor model to select the new instruction, a description of behavior for a functionality of the new instruction, and a description of timing of the new instruction; and
   transform the received transformable virtual processor model to the user virtual processor model according to the user-provided descriptions, wherein the user virtual processor model is configured to perform, on the host processor system, a behavior and timing accurate simulation of the user target processor according to the user-provided descriptions by performing at least one of:
      adding the new instruction associated with the user virtual processor model to the transformable instruction set;
      modifying a definition of one or more instructions in the transformable instruction set according to the user virtual processor model; and
      modifying a processor structure of the transformable virtual processor model by performing at least one of:
         adding an additional pipeline associated with the user virtual processor model to the transformable virtual processor model; and
         modifying the transformable pipeline of the transformable virtual processor model according to the user virtual processor model,
      wherein the user target processor is to be simulated using binary translation of target code associated with the user virtual processor model into host code associated with the host processor system, including caching translated target code for re-use during simulation of the user target processor.

28. A non-transitory computer-readable storage medium as recited in claim 27, wherein the behavior of the new instruction is provided for dynamically translating the target code with the new instruction into the host code for execution during the simulation of the user target processor.

29. A non-transitory computer-readable storage medium as recited in claim 27, wherein the timing of the new instruction is independent of the behavior of the new instruction.

30. A non-transitory computer-readable storage medium as recited in claim 27, wherein the timing of the new instruction is used to determine the number of clock ticks that the new instruction takes to execute when the user target processor executes the new instruction as part of the target code executing on the user target processor.

31. A non-transitory computer-readable storage medium as recited in claim 27, wherein the user target processor includes a user target pipeline, wherein the one or more user-provided descriptions includes a description of the user target pipeline, and wherein the timing of the new instruction is determined in relation to the description of the user target pipeline.

32. A non-transitory computer-readable storage medium as recited in claim 27, wherein the description of the new instruction includes a mnemonic function describing a disassembly of the new instruction for tracing the new instruction.

33. A non-transitory computer-readable storage medium as recited in claim 27, further including instructions that when executed by the one or more processors cause the one or more processors to provide one or more patterns to describe decoding of the new instruction.

* * * * *